(12) United States Patent
Aoyama

(10) Patent No.: US 6,495,113 B2
(45) Date of Patent: Dec. 17, 2002

(54) CARBON MONOXIDE CONCENTRATION REDUCING APPARATUS AND METHOD FOR DRIVING THE SAME

(75) Inventor: Satoshi Aoyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/247,858

(22) Filed: Feb. 11, 1999

(65) Prior Publication Data

US 2002/0006364 A1 Jan. 17, 2002

(30) Foreign Application Priority Data

Mar. 9, 1998 (JP) .............................. 10-076727

(51) Int. Cl.[7] .............................. C01B 3/58; H01M 8/06; B01J 8/00; B01J 8/04
(52) U.S. Cl. .................... 423/247; 423/437.2; 422/172; 422/177; 422/190; 422/211
(58) Field of Search ................................ 422/171–177, 422/190, 211; 429/17, 19, 246; 423/247, 437.2

(56) References Cited

U.S. PATENT DOCUMENTS

| | | | |
|---|---|---|---|
| 5,271,976 A | | 12/1993 | Vanderborgh et al. ...... 423/246 |
| 5,843,195 A | * | 12/1998 | Aoyama ...................... 48/127.7 |
| 5,874,051 A | * | 2/1999 | Heil et al. .................... 422/171 |
| 5,989,739 A | * | 11/1999 | Zur Megede et al. ......... 429/13 |

FOREIGN PATENT DOCUMENTS

| | | |
|---|---|---|
| EP | 1-0650922 | 5/1995 |
| EP | 1-0710996 | 5/1996 |
| EP | 1-0743694 | 11/1996 |
| EP | 2-0833401 | 4/1998 |
| JP | 8-133702 | 5/1996 |
| JP | 9-30802 | 2/1997 |
| WO | WO 97/43207 | 11/1997 |

* cited by examiner

Primary Examiner—Hien Tran
(74) Attorney, Agent, or Firm—Oliff & Berridge, PLC

(57) ABSTRACT

A carbon monoxide concentration reducing apparatus that raises the internal temperature of a CO-selective oxidation unit carrying a selective oxidation catalyst in as short a time period as possible after the apparatus is started, and a driving method for the apparatus are disclosed. In addition to the selective oxidation catalyst, the CO-selective oxidation unit contains an oxidation catalyst. The oxidation catalyst is capable of facilitating oxidation of an oxidizable gas component of a hydrogen-rich gas, even at temperatures substantially equal to a normal room temperature. The oxidation catalyst is, for example, a platinum (Pt) catalyst. Even when the internal temperature of the CO-selective oxidation unit is substantially equal to a normal room temperature, the oxidizable gas component of the hydrogen-rich gas can be oxidized by oxygen contained in an oxidative gas, via the function of the Pt catalyst. Using heat produced by this oxidation, the temperature of the hydrogen-rich gas can be raised, so that the internal temperature of the CO-selective oxidation unit can be raised to a desired temperature.

22 Claims, 10 Drawing Sheets

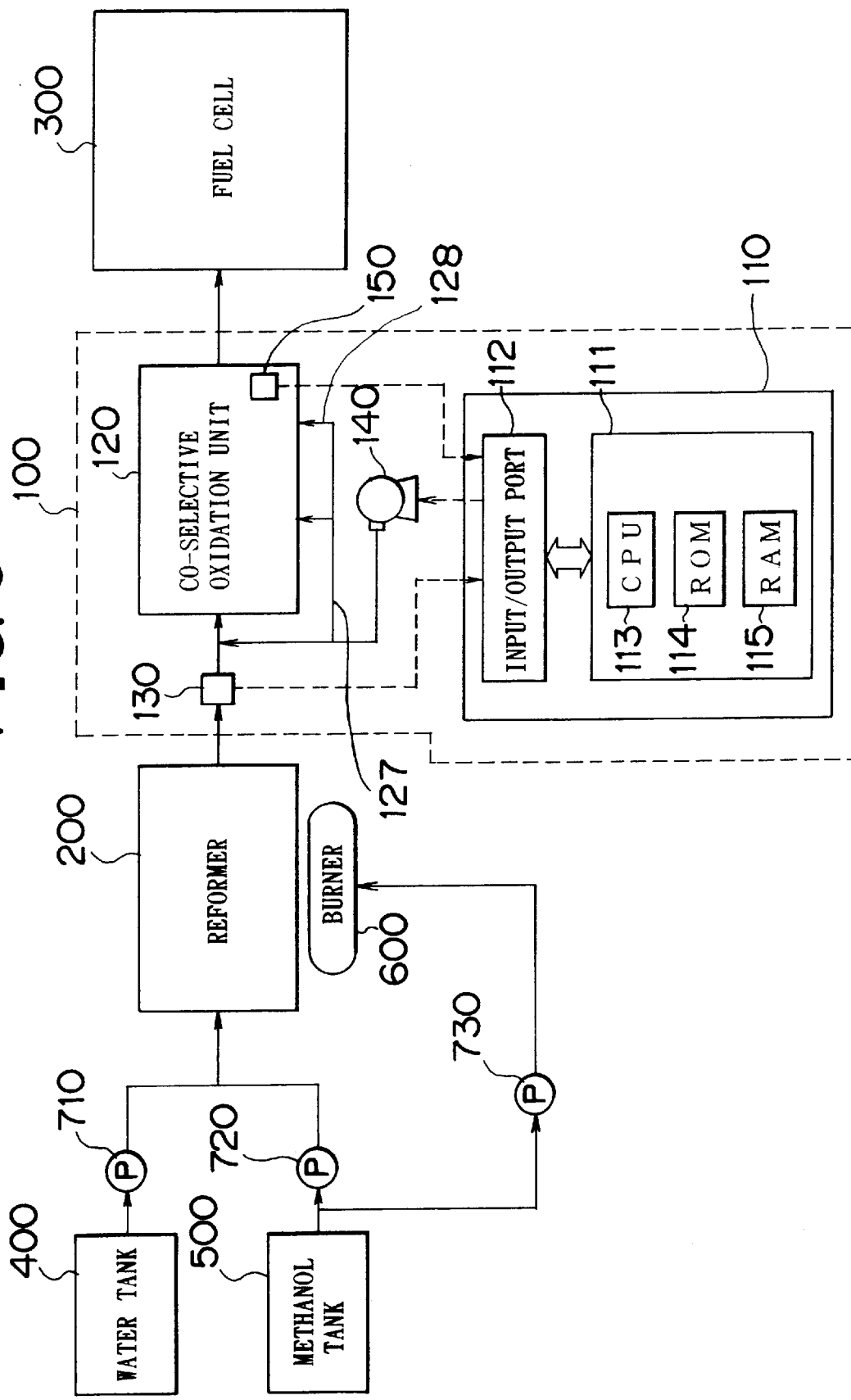

CARBON MONOXIDE CONCENTRATION REDUCING APPARATUS AND METHOD FOR DRIVING THE SAME

INCORPORATION BY REFERENCE

The disclosure of Japanese Patent Application No. HEI 10-76727 filed on Mar. 9, 1998 including the specification, drawings and abstract is incorporated herein by reference in its entirety.

BACKGROUND OF THE INVENTION

1. Field of Invention

The present invention relates to a technology for reducing the carbon monoxide concentration in a hydrogen-rich gas containing hydrogen and carbon monoxide that is less in concentration than hydrogen.

2. Description of Related Art

In a typical fuel cell system that uses a hydrogen-rich gas as a fuel, a hydrogen-rich gas is produced by a reformer, and then supplied to a fuel cell. The hydrogen-rich gas is produced in the reformer by introducing thereinto methanol as a fuel material and also introducing water, and causing a water vapor reforming reaction of methanol by using a copper-zinc (Cu-Zn) catalyst, that is, a methanol reformation catalyst. Since the water vapor reforming reaction of methanol is an endothermic reaction, it is necessary to supply heat from outside and maintain an optimal temperature of 200–300° C. for the reaction.

The water vapor reforming reaction of methanol can normally be expressed by formula (1):

$$CH_3OH + H_2O \rightarrow 3H_2 + CO_2 \tag{1}$$

For a more specific description, the reaction expressed by formula (1) can be divided into two reactions expressed by formulas (2) and (3):

$$CH_3OH \rightarrow CO + 2H_2 \tag{2}$$

$$CO + H_2O \rightarrow CO_2 + H_2 \tag{3}$$

As is apparent from the above formulas, the water vapor reforming reaction of methanol produces carbon monoxide (CO) as a byproduct.

In some cases, in order to eliminate the need for a heat supply from outside, an oxygen-containing oxidative gas (for example, air) is introduced into the reformer so that along with the water vapor reforming reaction of methanol, a partial oxidation reaction as expressed by formula (4), which is an exothermic reaction, is caused.

$$CH_3OH + 1/2 O_2 \rightarrow 2H_2 + CO_2 \tag{4}$$

In such a case, too, the water vapor reforming reaction of methanol occurs along with the reaction expressed by formula (4), so that carbon monoxide is still produced as a byproduct. Therefore, in any case, the hydrogen-rich gas produced by this type of reformer contains carbon monoxide.

If the hydrogen-rich gas produced by this type of reformer is directly supplied to a fuel cell, carbon monoxide contained in the hydrogen-rich gas is adsorbed to a platinum (Pt) catalyst provided in an electrode in the fuel cell. If the carbon monoxide concentration in the hydrogen-rich gas exceeds a predetermined allowable level, the correspondingly increased amount of carbon monoxide adsorbed to the Pt catalyst reduces the catalytic function thereof to an undesired level, so that a hydrogen decomposing reaction, that is, an anodic reaction in the fuel cell, is impeded and, therefore, the performance of the fuel cell decreases.

The allowable carbon monoxide concentration in the hydrogen-rich gas supplied to a fuel cell, for example, a polymer electrolyte fuel cell, is about several parts per million.

Therefore, in a typical fuel cell system that uses a hydrogen-rich gas as a fuel, a carbon monoxide concentration reducing device is disposed between the reformer and the fuel cell in order to reduce the carbon monoxide concentration in the hydrogen-rich gas.

The carbon monoxide concentration reducing device has a CO-selective oxidation portion whose interior is filled with a selective oxidation catalyst that selectively accelerates the oxidation of carbon monoxide. An oxygen-containing oxidative gas (for example, air) and the hydrogen-rich gas produced by the reformer are mixed, and the mixture thereof is introduced into the CO-selective oxidation portion, in which carbon monoxide in the hydrogen-rich gas is selectively oxidized by oxygen contained in the oxidative gas via the function of the selective oxidation catalyst so as to reduce the carbon monoxide concentration in the hydrogen-rich gas to a level of several ppm.

This type of carbon monoxide concentration reducing device is described in, for example, Japanese Patent Application Laid-open No. HEI 9-30802, which exemplifies several selective oxidation catalysts including a platinum-ruthenium (Pt-Ru) alloy catalyst, a ruthenium (Ru) catalyst, and the like.

However, this carbon monoxide concentration reducing device has the following problems. That is, immediately after the carbon monoxide concentration reducing device starts to be driven at the time of start of the fuel cell system, the internal temperature of the CO-selective oxidation portion is substantially equal to a room temperature (that is, an ambient temperature of the carbon monoxide concentration reducing device). Since the internal temperature of the reformer is relatively quickly raised to 200–300° C. as stated above, introduction of a warmed-up hydrogen-rich gas from the reformer into the CO-selective oxidation portion causes gradual increases in the internal temperature of the CO-selective oxidation portion. The temperature range in which an ordinary selective oxidation catalyst becomes able to perform its catalytic function (hereinafter, described as "becomes activated") is considerably higher than the ambient temperature of the carbon monoxide concentration reducing device, that is, a normal room temperature (for example, the aforementioned temperature range is 100° C. or higher). Therefore, it takes a considerably long time for the internal temperature of the CO-selective oxidation portion to reach the temperature range in which the selective oxidation catalyst becomes activated, after the carbon monoxide concentration reducing device starts to be driven. That is, a certain length of time is needed in some cases before the carbon monoxide concentration reducing device comes to effectively function. As a result, there is a danger that a longer time may be required before the fuel cell, disposed downstream of the carbon monoxide concentration reducing device, begins to effectively function.

SUMMARY OF THE INVENTION

Accordingly, it is an object of the present invention to provide a carbon monoxide concentration reducing apparatus which solves the aforementioned problems, that is, raises the internal temperature of a CO-selective oxidation unit carrying a selective oxidation catalyst as quickly as possible when the apparatus is started, and to provide a driving method for the apparatus.

To achieve some of the objects of the invention, a first aspect of the invention provides a carbon monoxide concentration reducing apparatus for reducing a concentration of carbon monoxide contained in a hydrogen-rich gas by using oxygen contained in an oxidative gas, the carbon monoxide concentration reducing apparatus including: a selective oxidizer into which the hydrogen-rich gas and the oxidative gas are introduced; a selective oxidation catalyst provided in the selective oxidizer, the selective oxidation catalyst selectively facilitating oxidation of carbon monoxide; and an oxidation catalyst provided in the selective oxidizer, the oxidation catalyst facilitating oxidation of at least one component of the hydrogen-rich gas. The oxidation catalyst facilitates the oxidation at least at a temperature substantially equal to an ambient temperature of the apparatus.

In this aspect of the invention, the selective oxidizer contains the selective oxidation catalyst and the oxidation catalyst that facilitates the oxidation of at least one component of the hydrogen-rich gas at a temperature at least substantially equal to an ambient temperature of the carbon monoxide concentration reducing apparatus, that is, substantially equal to a normal room temperature. Therefore, even when the internal temperature of the selective oxidizer is substantially equal to a normal room temperature, the selective oxidizer is able to produce heat through the oxidation of at least one component of the hydrogen-rich gas by oxygen in the oxidative gas, thereby raising the internal temperature of the selective oxidizer.

That is, according to the first aspect of the invention, when the carbon monoxide concentration reducing apparatus is started, the internal temperature of the selective oxidizer can be increased to or above a predetermined temperature in a short time period. Therefore, the internal temperature of the selective oxidizer can be raised to a temperature range in which the selective oxidation catalyst becomes activated, as quickly as possible. Consequently, the carbon monoxide concentration reducing apparatus will quickly become able to effectively function. If the carbon monoxide concentration reducing apparatus of the first aspect of the invention is incorporated in a fuel cell system, a fuel cell disposed downstream of the carbon monoxide concentration reducing apparatus will quickly become able to effectively function.

In this aspect, the carbon monoxide concentration reducing apparatus may further have a construction as follows. That is, the hydrogen-rich gas and the oxidative gas are mixed, and then a gas mixture thereof is introduced into the selective oxidizer via at least one inlet. The oxidation catalyst is provided near the at least one inlet of the gas mixture.

By providing the oxidation catalyst near the inlet, the construction of the selective oxidizer can be simplified and, at the same time, the production cost can be reduced.

The carbon monoxide concentration reducing apparatus may also have a construction as follows. That is, the hydrogen-rich gas and at least a portion of the oxidative gas are introduced into the selective oxidizer via different inlets, and the oxidation catalyst is provided near the inlets.

This construction makes it possible to introduce the oxidative gas substantially uniformly into various portions of the selective oxidizer. Therefore, the internal temperature of the selective oxidizer can be raised as quickly and uniformly as possible.

A second aspect of the invention provides a carbon monoxide concentration reducing apparatus for reducing a concentration of carbon monoxide contained in a hydrogen-rich gas by using oxygen contained in an oxidative gas, the carbon monoxide concentration reducing apparatus including: a selective oxidizer into which the hydrogen-rich gas and the oxidative gas are introduced; a selective oxidation catalyst provided in the selective oxidizer, the selective oxidation catalyst selectively facilitating oxidation of carbon monoxide; and a temperature raiser that raises a temperature of the hydrogen-rich gas to or above a predetermined temperature before the hydrogen-rich gas is introduced into the selective oxidizer.

In the second aspect of the invention, when the carbon monoxide concentration reducing apparatus is started, the temperature raiser raises the temperature of the hydrogen-rich gas to be introduced into the selective oxidizer, to or above a predetermined temperature. Therefore, even if the internal temperature of the selective oxidizer is substantially equal to a normal room temperature at the time of start of the carbon monoxide concentration reducing apparatus, the temperature of the hydrogen-rich gas to be introduced is raised to or above the predetermined temperature, so that the internal temperature of the selective oxidizer can be suitably raised.

That is, in the second aspect, also, the internal temperature of the selective oxidizer can be raised to or above the predetermined temperature in a relatively short time period following start of the apparatus. Therefore, the internal temperature of the selective oxidizer can be raised as quickly as possible to a temperature range in which the selective oxidation catalyst becomes activated.

In the second aspect, the carbon monoxide concentration reducing apparatus may further have a construction as follows. That is, an oxidation catalyst that facilitates oxidation of at least one component of the hydrogen-rich gas is provided in the selective oxidizer. At least when the apparatus is started, the oxidative gas containing oxygen is introduced into the temperature raiser.

This construction makes it possible to more quickly raise the temperature of the hydrogen-rich gas to be introduced into the selective oxidizer at the time of start of the carbon monoxide concentration reducing apparatus. Furthermore, the oxidation of the at least one component of the hydrogen-rich gas for the purpose of raising the temperature of the hydrogen-rich gas is performed by an oxidation device that is provided separately from the selective oxidation device, so that the amount of oxygen available in the selective oxidizer can be used solely for a reaction that reduces the carbon monoxide concentration in the hydrogen-rich gas. Therefore, the carbon monoxide concentration reducing capacity of the selective oxidizer is not reduced but can be fully utilized.

Furthermore, the carbon monoxide concentration reducing apparatus may further include a hydrogen-rich gas producer that produces the hydrogen-rich gas from a fuel material, a supplier that supplies the fuel material to the hydrogen-rich gas producer, and a heater that raises an internal temperature of the hydrogen-rich gas producer, wherein when the apparatus is started, an amount of the fuel material supplied by the supplier is increased at least to a predetermined amount.

This construction also makes it possible to more quickly raise the temperature of the hydrogen-rich gas to be introduced into the selective oxidizer at the time of start of the carbon monoxide concentration reducing apparatus.

Furthermore, since a component of the hydrogen-rich gas is not oxidized by using an oxidation catalyst, waste of such a component of the hydrogen-rich gas does not occur.

In the first and second aspects of the invention, the oxidation catalyst may be a platinum (Pt) catalyst. The Pt catalyst is capable of effectively facilitating the oxidation of hydrogen ($H_2$) in the hydrogen-rich gas and therefore generation of heat even at temperatures substantially equal to a normal room temperature.

A third aspect of the invention provides a carbon monoxide concentration reducing apparatus for reducing a concentration of carbon monoxide contained in a hydrogen-rich gas by using oxygen contained in an oxidative gas, the carbon monoxide concentration reducing apparatus including a selective oxidizer into which the hydrogen-rich gas and the oxidative gas are introduced, and a selective oxidation catalyst provided in the selective oxidizer, the catalyst selectively facilitating oxidation of carbon monoxide, wherein at least when the apparatus is started, an amount of moisture contained in the hydrogen-rich gas is reduced to or below a predetermined amount.

Normally, the reaction rate of oxidation catalyzed by the oxidation catalyst and the selective oxidation catalyst increases as the amount of moisture contained in the hydrogen-rich gas decreases. Therefore, by reducing the amount of moisture contained in the hydrogen-rich gas as described above, the reaction rate of oxidation can be improved even at temperatures substantially equal to a normal room temperature. Through an improvement in the reaction rate of oxidation catalyzed by the oxidation catalyst, a further reduction in the carbon monoxide concentration in the hydrogen-rich gas can be achieved. Furthermore, a reduction in the moisture content in the hydrogen-rich gas reduces or eliminates condensation of moisture in the selective oxidizer, so that degradation of the function of the selective oxidation catalyst due to condensation can be prevented.

According a further aspect of the invention, there is provided a driving method for a carbon monoxide concentration reducing apparatus, including the steps of: introducing a hydrogen-rich gas containing carbon monoxide, into a reaction chamber containing a selective oxidation catalyst that selectively facilitates oxidation of carbon monoxide; reducing a carbon monoxide concentration in the hydrogen-rich gas by oxidizing carbon monoxide contained in the hydrogen-rich gas by using the selective oxidation catalyst; discharging the hydrogen-rich gas in which the carbon monoxide concentration has been reduced, from the reaction chamber; and raising a temperature of the reaction chamber to or above a predetermined temperature at least when the apparatus is started.

In this driving method, the temperature of the reaction chamber, in which the selective oxidation of carbon monoxide is caused, is raised to or above the predetermined temperature at least when the carbon monoxide concentration reducing apparatus is started.

Therefore, even if the temperature of the reaction chamber is substantially equal to a normal room temperature immediately after start of the apparatus, the temperature of the reaction chamber can be raised to or above the predetermined temperature in a relatively short time period. That is, the temperature in the reaction chamber can be raised as quickly as possible to a temperature range in which the selective oxidation catalyst becomes activated. Consequently, the carbon monoxide concentration reducing apparatus will quickly become able to effectively function.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIG. 6 is a block diagram of a fuel cell system incorporating a carbon monoxide concentration reducing apparatus according to a third embodiment of the invention;

DETAILED DESCRIPTION OF PREFERRED EMBODIMENTS

Preferred embodiments of the present invention will be described in detail hereinafter with reference to the accompanying drawings.

Figure 1:
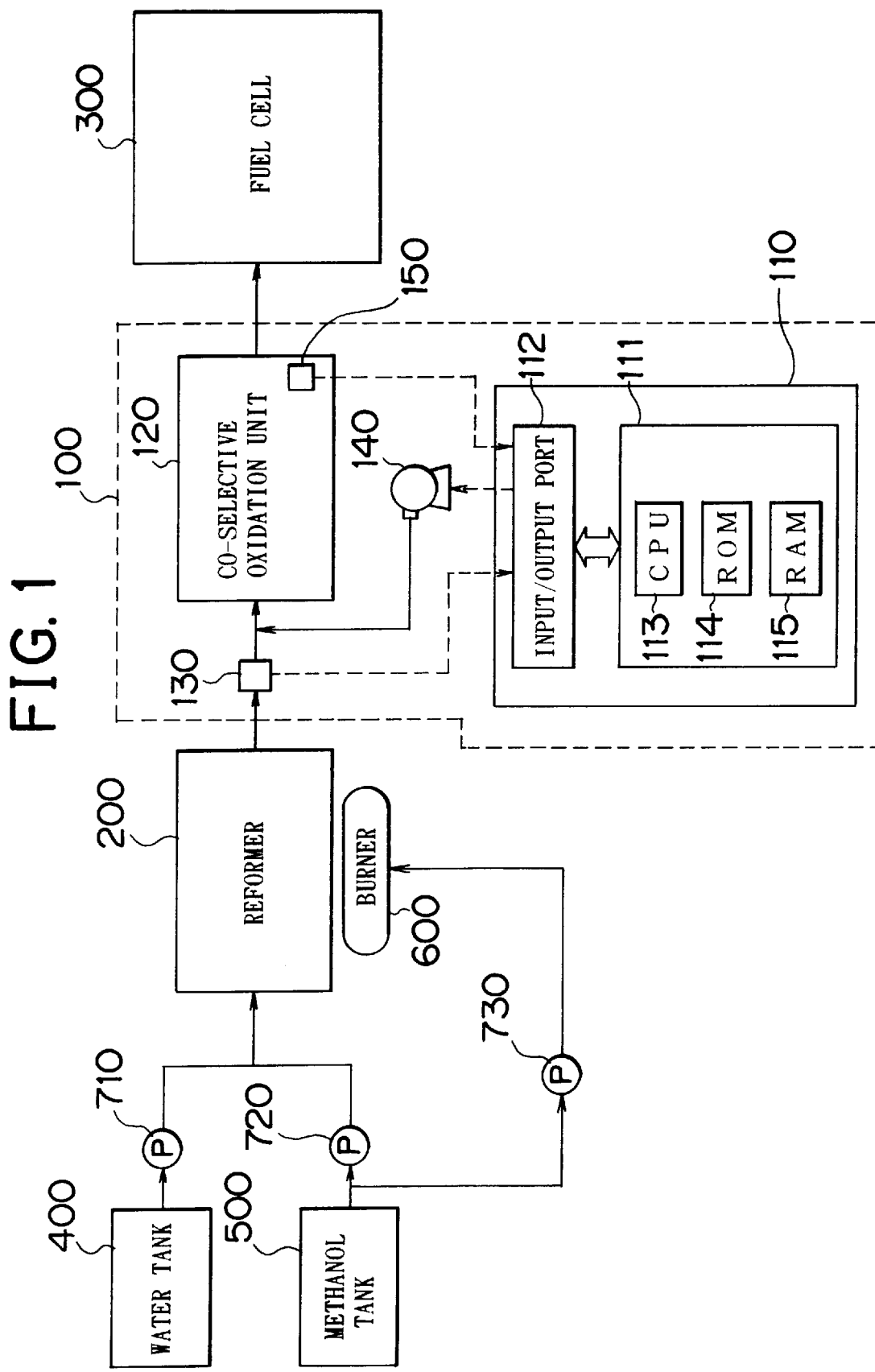
FIG. 1 is a block diagram of a fuel cell system incorporating a carbon monoxide concentration reducing apparatus according to a first embodiment of the invention.

FIG. 1 is a block diagram of a fuel cell system that employs a carbon monoxide concentration reducing apparatus according to a first embodiment of the invention. The fuel cell system includes a carbon monoxide concentration reducing apparatus 100, a reformer 200, a fuel cell 300, a water tank 400, a methanol tank 500, a burner 600, and pumps 710, 720, 730.

The water tank 400 stores water, and the methanol tank 500 stores methanol. The pumps 710, 720 supply water from the water tank 400 and methanol from the methanol tank 500, respectively, to the reformer 200, via respective supply passages.

The reformer 200 produces a hydrogen-rich gas (reformed gas) containing hydrogen through the water vapor reforming reaction of methanol expressed by formula (1) by using water and methanol (fuel material) supplied thereto.

More specifically, the reformer 200 has a vaporizing portion and a reforming portion. The vaporizing portion vaporizes water and methanol supplied thereto, and supplies a gas mixture thereof as a fuel material gas to the reforming portion.

The reforming portion of the reformer 200 is filled with a methanol reformation catalyst, which is a copper-zinc (Cu-Zn) catalyst in this embodiment. The Cu-Zn catalyst is a catalyst formed of metal oxides produced through coprecipitation. In this embodiment, the Cu-Zn catalyst is used in the form of tablets of about 1/8 inch diameter.

In the reformer 200, the fuel material gas supplied from the vaporizing portion contacts the Cu-Zn catalyst, and the water vapor reforming reaction of methanol proceeds on the catalytic surface. As the reaction progresses, hydrogen and carbon dioxide are generated. Thus, a hydrogen-rich gas is produced.

The water vapor reforming reaction of methanol conducted in the reformer 200 is an endothermic reaction as a whole, as stated above. Therefore, in order to provide an amount of heat needed for the reaction, the reformer 200 is equipped with the burner 600. The burner 600 supplies heat to the reformer 200 by combustion of methanol fuel supplied from the methanol tank 500 via the pump 730. The operating temperature (internal temperature) of the reformer 200 is kept within a range of from about 200° C. to about 300° C. which is optimal for the reaction, by appropriately controlling the pump 730 so as to regulate the amount of methanol supplied to the burner 600. The amount of heat needed to vaporize water and methanol in the vaporizing portion is also supplied by the burner 600.

Through the water vapor reforming reaction of methanol, the reformer 200 also produces carbon monoxide as a byproduct as expressed in formula (2). Therefore, a final product of hydrogen-rich gas contains carbon monoxide besides hydrogen and carbon dioxide. The carbon monoxide concentration in the hydrogen-rich gas is determined depending on the kind of the methanol reformation catalyst contained the reformer 200, the operating temperature (internal temperature) of the reformer 200, the amounts of water and methanol supplied to the reformer 200 per unit volume, and the like.

In the water vapor reforming reaction of methanol in the reformer 200, water and methanol react theoretically at a ratio of 1:1 as indicated in formula (1). However, the ratio of supply of water to the supply of methanol is pre-set to a value greater than 1, more specifically, to 1.5–3 in $H_2O/CH_3OH$ ratio (generally termed S/C ratio (steam/carbon ratio)).

The S/C ratio is set greater than 1 for the following purposes:
1. To increase the reaction rate of the water vapor reforming reaction of methanol.
2. To reduce the amount of carbon monoxide produced as a byproduct (that is, to accelerate the reaction expressed by formula (3)).
3. To ensure that moisture is contained in the hydrogen-rich gas supplied to the fuel cell 300 (that is, to supply moisture to an anode of the fuel cell 300).

Therefore, the hydrogen-rich gas finally discharged from the reformer 200 contains hydrogen ($H_2$), carbon dioxide ($CO_2$), carbon monoxide (CO), and moisture ($H_2O$).

The hydrogen-rich gas from the reformer 200 is then introduced into the carbon monoxide concentration reducing apparatus 100, which reduces the concentration of carbon monoxide contained in the hydrogen-rich gas and then discharges the gas. The construction and operation of the carbon monoxide concentration reducing apparatus 100 will be described in detail later.

The hydrogen-rich gas from the carbon monoxide concentration reducing apparatus 100 is introduced as a fuel gas into the fuel cell 300. An oxidative gas containing oxygen is also introduced into the fuel cell 300. Therefore, an electrochemical reaction as expressed below is conducted to provide an electromotive force.

$$H_2 \rightarrow 2H^+ + 2e^- \qquad (5)$$

$$2H^+ + 2e^- + 1/2 O_2 \rightarrow H_2O \qquad (6)$$

$$H_2 + 1/2 O_2 \rightarrow H_2O \qquad (7)$$

Formula (5) expresses a reaction that occurs at the anode. Formula (6) expresses a reaction that occurs at the cathode. In the fuel cell 300 as a whole, the reaction expressed by formula (7) progresses. In this embodiment, the fuel cell 300 is a polymer electrolyte fuel cell formed by stacking a plurality of unit cells (not shown) each formed of an electrolyte film, an anode, a cathode, a separator, and the like. The hydrogen-rich gas introduced into the fuel cell 300 is supplied to the anode of each unit cell via a fuel gas passage (not shown). The oxidative gas is supplied to the cathode of each unit cell via an oxidative gas passage (not shown).

The carbon monoxide concentration reducing apparatus 100 of this embodiment will be described further in detail.

As shown in FIG. 1, the carbon monoxide concentration reducing apparatus 100 of this embodiment includes a control unit 110, a CO-selective oxidation unit 120, a carbon monoxide sensor 130, a blower 140, and a temperature sensor 150. The hydrogen-rich gas from the reformer 200 is introduced into the CO-selective oxidation unit 120. The CO-selective oxidation unit 120 selectively oxidizes carbon monoxide contained in the gas, so that the carbon monoxide concentration in the gas decreases. Due to this process, the CO-selective oxidation unit 120 discharges a hydrogen-rich gas in which the carbon monoxide concentration is equal to or lower than a predetermined level. The construction of the CO-selective oxidation unit 120 will be described in detail later.

The carbon monoxide sensor 130 is disposed in a hydrogen-rich gas supply passage extending from the reformer 200 to the CO-selective oxidation unit 120. The carbon monoxide sensor 130 detects the carbon monoxide concentration in the hydrogen-rich gas to be introduced into the CO-selective oxidation unit 120, and outputs the detection result as a detection signal to the control unit 110.

The temperature sensor 150 is disposed inside the CO-selective oxidation unit 120. The temperature sensor 150 detects the internal temperature of the CO-selective oxidation unit 120, and outputs the detection result as a detection signal to the control unit 110.

The control unit 110 includes a processing circuit 111, and an input/output port 112 as shown in FIG. 1. The processing circuit 111 includes a CPU 113, a ROM 114 and a RAM 115. The CPU 113 executes predetermined operations in accordance with control programs, to perform various processings and controls. The ROM 114 is a memory in which the control programs, and control data used for the CPU 113 to execute various operations, are pre-stored. The RAM 115 is a memory for temporarily storing various data obtained through execution of various operations. The input/output port 112 receives detection signals from various sensors, for example, the detection signal from the carbon monoxide sensor 130, a detection signal from the temperature sensor 150, and the like, and transmits the detection signals to the processing circuit 111. Further, the input/output port 112 outputs drive signals to the blower 140 and the like in accordance with instructions from the processing circuit 111.

The blower 140 draws in the oxygen-containing oxidative gas, for example, air, and sends it into a hydrogen-rich gas passage extending from the carbon monoxide sensor 130 to the CO-selective oxidation unit 120, in accordance with the drive signal from the control unit 110. Thereby, the oxidative gas is mixed with the hydrogen-rich gas.

Figure 2:
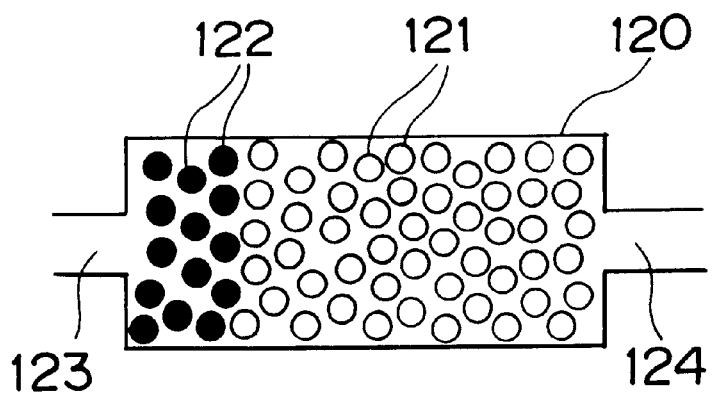
FIG. 2 is a schematic sectional view of an internal construction of a CO-selective oxidation unit shown in FIG. 1.

The construction and operation of the CO-selective oxidation unit 120 will now be described with reference to FIG. 2. FIG. 2 is a schematic sectional view of an internal construction of the CO-selective oxidation unit 120 shown in FIG. 1. In FIG. 2, the temperature sensor 150 shown in FIG. 1 is omitted.

As shown in FIG. 2, the internal space of the CO-selective oxidation unit 120 is filled with many beads of selective oxidation catalyst 121. The selective oxidation catalyst 121 is a catalyst that selectively facilitates the oxidation of carbon monoxide. In this embodiment, the selective oxidation catalyst 121 is a platinum-ruthenium (Pt-Ru) alloy catalyst.

When a mixture of the hydrogen-rich gas and the oxidative gas is introduced into the CO-selective oxidation unit 120 through an inlet 123, carbon monoxide in the hydrogen-rich gas is selectively oxidized by the oxygen in the oxidative gas as expressed by formula (8), via the function of the Pt-Ru alloy catalyst, that is, the selective oxidation catalyst 121. The carbon monoxide concentration in the gas is thus reduced. The CO-selective oxidation unit 120 lets out a hydrogen-rich gas in which the carbon monoxide concentration has been reduced to a level of several ppm, through an outlet 124.

$$2CO + O_2 \rightarrow 2CO_2 \tag{8}$$

For this process, the control unit 110 controls the flow of the oxidative gas supplied by the blower 140, on the basis of the carbon monoxide concentration detected by the carbon monoxide sensor 130. More specifically, on the basis of the mole ratio $[O_2]/[CO]$ between oxygen in the oxidative gas and carbon monoxide in the hydrogen-rich gas, the amount of the oxidative gas supplied is controlled. A suitable reference value of the mole ratio $[O_2]/[CO]$ between oxygen and carbon monoxide was determined through experiments.

If the oxidation of carbon monoxide occurs theoretically, the optimal mole ratio $[O_2]/[CO]$ is 0.5 according to formula (8). In reality, the mole ratio of oxygen needs to be increased in order to cause sufficient oxidation of carbon monoxide inside the CO-selective oxidation unit 120. However, an excessive amount of oxygen also accelerates the oxidation of hydrogen. Moreover, if the supply of oxidative gas is increased in order to increase the supply of oxygen, the partial pressure of hydrogen in the hydrogen-rich gas correspondingly decreases. These problems must be minimized. Actually, supplies of oxygen for sufficient oxidation of carbon monoxide within such a range that the problems caused by an increase in the supply of oxidative gas are minimal and acceptable, were determined through experiments. Experimental results show that a preferable value of the mole ratio is within a range of from about 2 to about 3. In this embodiment, the mole ratio between oxygen and carbon monoxide is $[O_2]/[CO]=3$.

A normal temperature range in which the Pt-Ru alloy catalyst, that is, the selective oxidation catalyst 121, becomes activated is from about 100° C. to about 200° C. Therefore, in a normal operation, this embodiment performs control such that the internal temperature of the CO-selective oxidation unit 120 remains within the range of from about 100° C. to about 200° C.

However, immediately after the carbon monoxide concentration reducing apparatus 100 is started at the time of start of the fuel cell system, the internal temperature of the CO-selective oxidation unit 120 is substantially equal to an ambient temperature of the carbon monoxide concentration reducing apparatus 100 (that is, a normal room temperature), as mentioned above. If no special measure is provided, it takes a considerably long time for the carbon monoxide concentration reducing apparatus 100 to become able to effectively function after start of the carbon monoxide concentration reducing apparatus 100.

In this embodiment, therefore, the CO-selective oxidation unit 120 is filled with a predetermined amount of beads of oxidation catalyst 122, in addition to the selective oxidation catalyst 121, as shown in FIG. 2. The oxidation catalyst 122 is capable of facilitating the oxidation of oxidizable gas components in the hydrogen-rich gas even at temperatures substantially equal to a normal room temperature. In this embodiment, platinum (Pt) is used for the oxidation catalyst 122.

If the oxidation catalyst 122, that is, a Pt catalyst, is contained in the CO-selective oxidation unit 120 in this manner, the oxidizable gas components of the hydrogen-rich gas can be oxidized by oxygen contained in the oxidative gas via the function of the Pt catalyst even when the internal temperature of the CO-selective oxidation unit 120 is substantially equal to a normal room temperature. Therefore, since the oxidation produces heat, the temperature of the hydrogen-rich gas is quickly increased, so that the internal temperature of the CO-selective oxidation unit 120 can be quickly increased.

In this embodiment, the oxidizable gas components of the hydrogen-rich gas are hydrogen ($H_2$) and carbon monoxide (CO). The hydrogen concentration in the hydrogen-rich gas is about 75%, whereas the carbon monoxide concentration is less than about 1%. Therefore, the oxidation facilitated by the oxidation catalyst 122, that is, the Pt catalyst, is mostly the oxidation of hydrogen.

Figure 3:
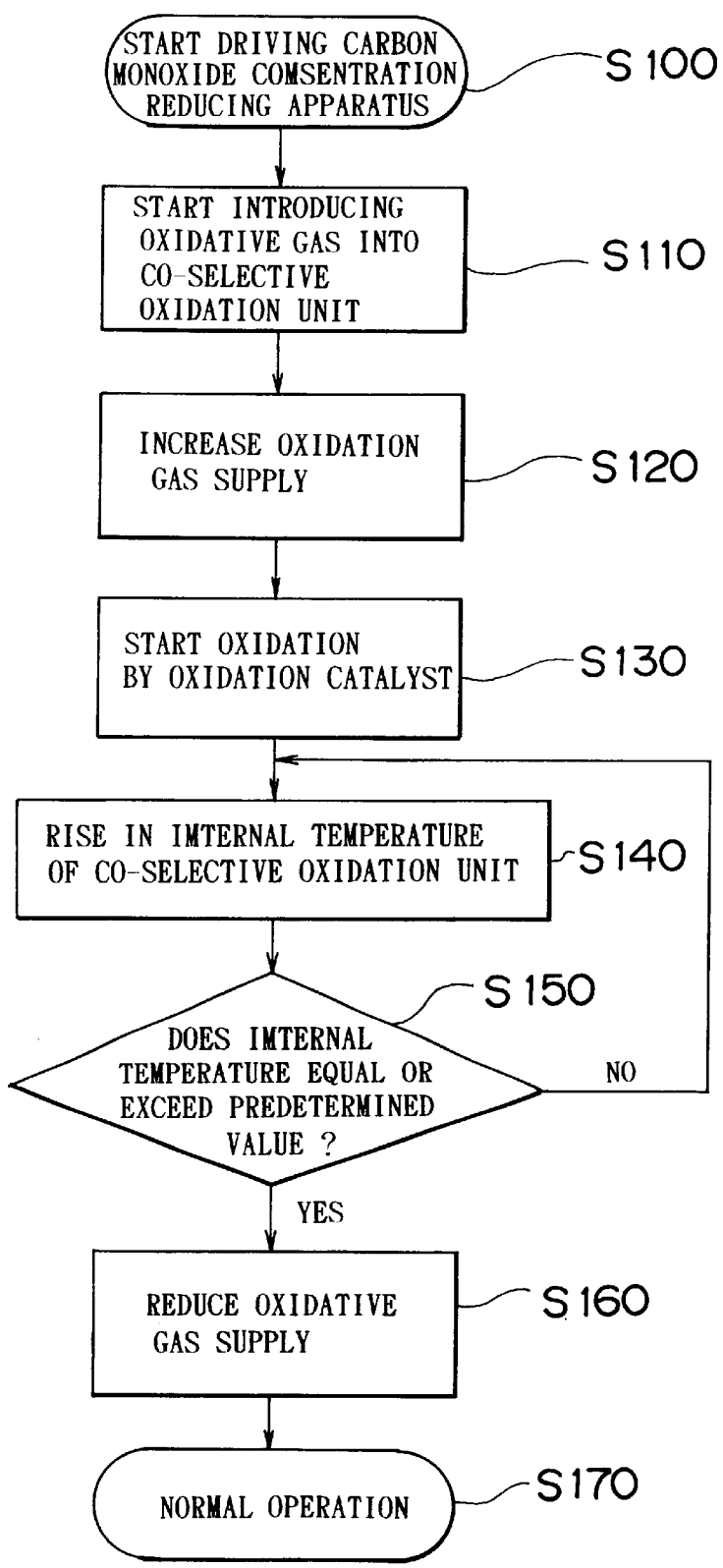
FIG. 3 is a flowchart illustrating an operation that is performed by the carbon monoxide concentration reducing apparatus shown in FIG. 1 when the apparatus is started.

A method of driving the carbon monoxide concentration reducing apparatus of this embodiment at the time of start of the apparatus will be described. FIG. 3 is a flowchart illustrating an operation that is performed by the carbon monoxide concentration reducing apparatus 100 shown in FIG. 1 when the apparatus 100 is started.

When the fuel cell system is started so that the driving of the reformer 200 and the like is started, a hydrogen-rich gas is discharged from the reformer 200. When the driving of the carbon monoxide concentration reducing apparatus 100 is started in step S100 in FIG. 3, the blower 140 is driven by the control unit 110, so as to send out the oxidative gas. The oxidative gas mixes with the hydrogen-rich gas, and the mixture thereof is introduced into the CO-selective oxidation unit 120 in step S110.

During a normal operation, the control unit 110 controls the blower 140 so that the amount of oxidative gas supplied by the blower 140 is a minimum amount that is needed to sufficiently oxidize the amount of carbon monoxide contained in the hydrogen-rich gas, that is, the ratio $[O_2]/[CO]$ becomes equal to 3, as mentioned above. However, at the time of start, the control unit 110 controls the blower 140 so that the supply of oxidative gas becomes greater than that provided during a normal operation, in step S120. For example, the control unit 110 performs control such that the supply of oxidative gas becomes equal to an amount that is needed to oxidize substantially the entire amount of hydrogen in the hydrogen-rich gas. More specifically, the amount of oxidative gas supplied at the time of start is increased to about 20–30 times the amount supplied during a normal operation, considering that the hydrogen concentration in the hydrogen-rich gas is about 75% whereas the carbon monoxide concentration is about 0.5%.

When the mixture of the oxidative gas and the hydrogen-rich gas is introduced into the CO-selective oxidation unit 120, the oxidation of hydrogen starts via the function of the oxidation catalyst 122 in step S130 even though the internal temperature of the CO-selective oxidation unit 120 is substantially equal to a normal room temperature. Due to heat produced by the oxidation, the temperature of the hydrogen-rich gas increases, so that the internal temperature of the CO-selective oxidation unit 120 increases in step S140. Since the oxidation catalyst 122, that is, the Pt catalyst, is disposed near the inlet 123 of the CO-selective oxidation unit 120, increases in the internal temperature of the CO-selective oxidation unit 120 start in an interior portion adjacent to the inlet 123 and gradually propagate toward the outlet 124.

The internal temperature of the CO-selective oxidation unit 120 continues rising, and finally reaches the temperature range in which the selective oxidation catalyst 121 becomes activated. Therefore, the selective oxidation catalyst 121, that is, the Pt-Ru alloy catalyst, is activated, so that carbon monoxide in the hydrogen-rich gas is selectively oxidized via the function of the selective oxidation catalyst 121.

During this process, the internal temperature of the CO-selective oxidation unit 120 is detected by the temperature sensor 150, and the detection result is inputted to the control unit 110. Based on the detection result, the control unit 110 determines in step S150 whether the internal temperature of the CO-selective oxidation unit 120 has become equal to or higher than a predetermined temperature, that is, a sufficiently high temperature such that the selective oxidation catalyst 121 can become activated. When the internal temperature of the CO-selective oxidation unit 120 has reached or exceeded the predetermined temperature, the control unit 110 performs a control such that the supply of oxidative gas decreases, in step S160. Subsequently, a normal operation is performed in step S170, that is, the control unit 110 controls the supply of oxidative gas so that the ratio $[O_2]/[CO]$ becomes equal to 3, as mentioned above.

In this manner, the embodiment raises the internal temperature of the CO-selective oxidation unit 120 to or above the predetermined temperature (for example, 100° C.) in a short time period following start of the carbon monoxide concentration reducing apparatus 100. That is, the embodiment is able to increase the internal temperature of the CO-selective oxidation unit 120 as quickly as possible to the temperature range in which the selective oxidation catalyst 121, that is, the Pt-Ru alloy catalyst, becomes activated. Therefore, the carbon monoxide concentration reducing apparatus 100 quickly becomes able to effectively function. Consequently, the fuel cell 300 disposed downstream of the carbon monoxide concentration reducing apparatus 100 will quickly become able to effectively function.

Furthermore, since the oxidation catalyst 122, that is, the Pt catalyst, is disposed only at a location near the inlet 123 in the CO-selective oxidation unit 120 in this embodiment as shown in FIG. 2, the internal construction of the CO-selective oxidation unit 120 can be simplified and, therefore, the production cost can be reduced.

Brief descriptions will be made about methods for producing the oxidation catalyst 122, that is, the Pt catalyst, and the selective oxidation catalyst 121, that is, the Pt-Ru alloy catalyst, which fill the CO-selective oxidation unit 120 in this embodiment.

The Pt catalyst is produced as follows. First, porous ceramic alumina pellets of about 3 mm diameter are placed in distilled water. While the water is being stirred together with the alumina pellets, an aqueous solution of platinum chloride is gradually dripped, so that platinum salt is adsorbed to the alumina pellets. The alumina pellets, having adsorbed platinum salt, are then removed, and dried by evaporating moisture therefrom. Subsequently, in a hydrogen reducing atmosphere, platinum on the alumina pellets is reduced and residual chloride is completely removed by heating at 250–350° C. for about 2 hours. The alumina pellets loaded with platinum are heated at 800–900° C. in an inert gas atmosphere (for example, a nitrogen or argon atmosphere) for about 1 hour. As a result, Pt catalyst pellets in which alumina pellets carry platinum thereon are obtained.

The Pt-Ru alloy catalyst is produced in a similar manner. First, alumina pellets are placed in distilled water. While the water is being stirred together with the alumina pellets, an aqueous solution of ruthenium chloride is gradually dripped, so that ruthenium salt is adsorbed to the alumina pellets. The alumina pellets, having adsorbed ruthenium salt, are then removed, and dried by evaporating moisture therefrom. Subsequently, by heating in a hydrogen reducing atmosphere, ruthenium on the alumina pellets is reduced and residual chloride is completely removed. After that, the alumina pellets are placed in distilled water again. While the water is being stirred, an aqueous solution of platinum chloride is gradually dripped, so that platinum salt is adsorbed to the alumina pellets. The alumina pellets are then removed, and dried by evaporating moisture therefrom. Subsequently, by heating in a hydrogen reducing atmosphere, platinum on the alumina pellets is reduced and residual chloride is completely removed. The alumina pellets thus loaded with ruthenium and platinum are heated in an inert gas flow, so that platinum and ruthenium are alloyed on the alumina pellets, thereby providing a Pt-Ru alloy catalyst.

The loading concentration of the Pt-Ru alloy catalyst and the composition ratio between Pt and Ru can be set to arbitrary values by adjusting the amounts of alumina pellets, ruthenium chloride and platinum chloride. In this embodiment, the composition ratio between Pt and Ru is set to 1:1. The ratio may be 1:10–10:1 and, preferably, within the range of 1:3–3:1. The loading concentration may be from about 0.1 wt. % to about 1.0 wt. % and, preferably, from about 0.2 wt. % to about 0.5 wt. %.

Although in the above-described Pt-Ru alloy catalyst producing method, ruthenium and then platinum are adsorbed to the alumina pellets before the alloying process, it is also possible to first adsorb platinum to alumina pellets and then adsorb ruthenium thereto before the alloying process. Furthermore, it is possible to simultaneously adsorb platinum and ruthenium to alumina pellets in distilled water by simultaneously dripping into the distilled water a ruthenium chloride aqueous solution and a platinum chloride aqueous solution. Although in the above-described production method, ruthenium chloride is used to load the alumina pellets with ruthenium, it is also possible to use, instead of ruthenium chloride, one or a combination of two or more of ruthenium nitrate, ruthenium iodide, chlororuthenic acid, ammonium chlororuthenate, ruthenium hydroxide, potassium ruthenate, and the like.

Although in the Pt catalyst producing method and the Pt-Ru alloy catalyst producing method, platinum chloride is used to load the alumina pellets with platinum, it is also possible to use, instead of platinum chloride, platinum hydroxide, chloroplatinic acid, ammonium chloroplatinate, and the like.

The Pt catalyst and the Pt-Ru alloy catalyst may also be produced by methods other than the above-described methods.

A second embodiment of the carbon monoxide concentration reducing apparatus of the invention will now be described with reference to FIGS. 4 and 5. Each of FIGS. 4 and 5 is a schematic sectional view of the interior of a CO-selective oxidation unit 120 used in the second embodiment of the carbon monoxide concentration reducing apparatus of the invention.

The construction of the carbon monoxide concentration reducing apparatus of this embodiment is substantially the same as that of the carbon monoxide concentration reducing apparatus shown in FIG. 1, except for the internal construction of the CO-selective oxidation unit 120.

In the first embodiment, the oxidation catalyst 122 is disposed locally or concentratedly near the inlet 123 in the CO-selective oxidation unit 120 as shown in FIG. 2. In contrast, in the second embodiment, an oxidation catalyst 122 is disposed in the CO-selective oxidation unit 120 in a spread manner, more specifically, in a dispersed manner and in a separated manner as shown in FIGS. 4 and 5, respectively. More specifically, in a CO-selective oxidation unit 120 shown in FIG. 4, the oxidation catalyst 122 is substantially uniformly dispersed. In a CO-selective oxidation unit 120 shown in FIG. 5, the oxidation catalyst 122 is spread at three different locations in the unit 120, that is, it is separated at a location near the inlet 123, a location forward of the center of the CO-selective oxidation unit 120, and a location rearward of the center thereof. In FIGS. 4 and 5, the temperature sensor 150 is omitted for simplicity.

Figure 4:
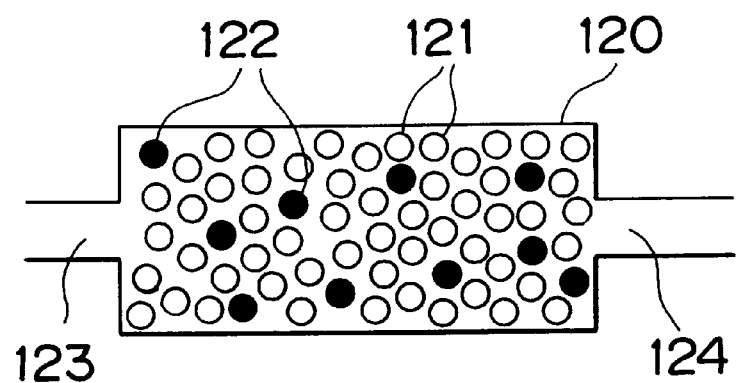
FIGS. 4 and 5 are schematic sectional views of the internal construction of a CO-selective oxidation unit employed in a carbon monoxide concentration reducing apparatus according to a second embodiment of the invention.
Figure 5:
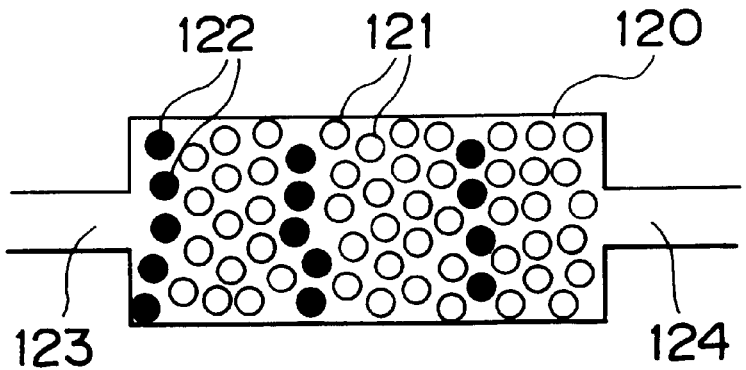

In the second embodiment shown in FIGS. 4 and 5, the oxidation catalyst 122 is not concentrated in a certain portion of the CO-selective oxidation unit 120, but it is spread over the interior of the CO-selective oxidation unit 120, so that the oxidation via the oxidation catalyst 122, mainly the oxidation of hydrogen in the hydrogen-rich gas, occurs in substantially the entire interior of the CO-selective oxidation unit 120. Therefore, the internal temperature of the CO-selective oxidation unit 120 increases substantially uniformly throughout the entire interior thereof. Since an excessive temperature rise concentrated at a particular location in the CO-selective oxidation unit 120 is avoided, this embodiment prevents thermal degradation of the selective oxidation catalyst 121 filling the CO-selective oxidation unit 120.

The method for driving the carbon monoxide concentration reducing apparatus 100 of this embodiment at the time of start of the apparatus 100 is substantially the same as that of the first embodiment, and will not be described again.

A third embodiment of the carbon monoxide concentration reducing apparatus of the invention will now be described with reference to FIGS. 6 and 7.

FIG. 6 is a block diagram of a fuel cell system employing a carbon monoxide concentration reducing apparatus 100 according to the third embodiment of the invention.

In a case where the hydrogen-rich gas produced by a reformer 200 is mixed with an oxidative gas (air in this embodiment) and the mixture thereof is introduced into a CO-selective oxidation unit 120, the selective oxidation of carbon monoxide catalyzed by a selective oxidation catalyst 121 normally occurs to a greater extent at a location near an inlet 123 then at locations far from the inlet 123, since oxygen is richer near the inlet 123. Therefore, high temperatures are likely to occur near the inlet 123 in the CO-selective oxidation unit 120.

In the carbon monoxide concentration reducing apparatus 100 of this embodiment as shown in FIG. 6, the oxidative gas (air) supplied by a blower 140 is introduced not only into a hydrogen-rich gas supply passage extending from a carbon monoxide sensor 130 to the CO-selective oxidation unit 120, but also directly into the CO-selective oxidation unit 120, via branch passages 126, 127, 128 from the oxidative gas passage extending from the blower 140 to the hydrogen-rich gas supply passage. Thus, the oxidative gas is introduced into the CO-selective oxidation unit 120 in a multi-stage manner. The other constructions of the carbon monoxide concentration reducing apparatus 100 and the fuel cell system are substantially the same as those illustrated in FIG. 1.

Figure 7:
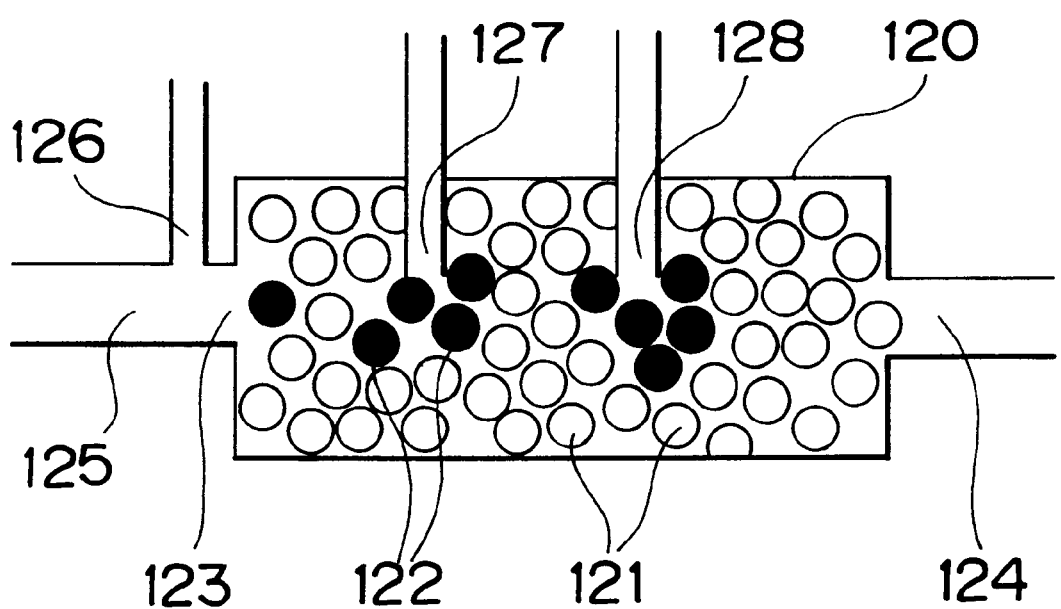
FIG. 7 is a schematic sectional view of the internal construction of the CO-selective oxidation unit shown in FIG. 6.

FIG. 7 is a schematic sectional view of the internal construction of the CO-selective oxidation unit 120 shown in FIG. 6. In FIG. 7, the temperature sensor 150 is omitted.

Referring to FIG. 7, the hydrogen-rich gas from the reformer 200 is introduced through a hydrogen-rich gas inlet 125. The oxidative gas supplied by the blower 140 is introduced through an oxidative gas inlet 126. Therefore, a mixture of the hydrogen-rich gas and the oxidative gas is introduced into the CO-selective oxidation unit 120 through an inlet 123. The oxidative gas is also introduced into the CO-selective oxidation unit 120 via branch passages extending between the oxidative gas passage from the blower 140 and oxidative gas inlets 127, 128 of the CO-selective oxidation unit 120.

The oxidative gas is introduced into the CO-selective oxidation unit 120 in a multi-stage manner in this embodiment. Therefore, during a normal operation, the selective oxidation of carbon monoxide via the function of the selective oxidation catalyst 121 occurs in substantially the entire interior of the CO-selective oxidation unit 120, so that substantially uniform temperatures can be achieved in the entire interior of the CO-selective oxidation unit 120.

In the CO-selective oxidation unit 120 having a plurality of inlets for the oxidative gas as shown in FIG. 7, the oxidation catalyst 122 is disposed not only near the inlet 123 but also near the oxidative gas inlets 127, 128.

Since the oxidation catalyst 122 is disposed near the oxidative gas inlets 127, 128 (also near the inlet 123), large amounts of oxygen are supplied to the oxidation catalyst 122 when the oxidative gas is introduced into the CO-selective oxidation unit 120 by the blower 140 when the system is started. Therefore, the oxidization catalyzed by the oxidation catalyst 122 is further accelerated, so that the internal temperature of the CO-selective oxidation unit 120 can be rapidly increased. Furthermore, since the oxidation catalyst 122 is spread as in islands in the CO-selective oxidation unit 120, a substantially uniform internal temperature of the CO-selective oxidation unit 120 can be quickly achieved. Therefore, the carbon monoxide concentration reducing apparatus 100 will quickly become able to effectively function.

A fourth embodiment of the invention will now be described with reference to FIGS. 8 and 9. In the first to third embodiments, the oxidation catalyst, such as the Pt catalyst, is contained into the CO-selective oxidation unit 120, so that at the time of start of the carbon monoxide concentration reducing apparatus 100, the temperature of the hydrogen-rich gas is increased by heat produced through the oxidation mainly of hydrogen in the hydrogen-rich gas occurring in the CO-selective oxidation unit 120 and, therefore, the internal temperature of the CO-selective oxidation unit 120 is increased. In the fourth embodiment, in contrast, a hydrogen-rich gas oxidation unit filled with an oxidation catalyst is disposed upstream of a CO-selective oxidation unit 120. At the time of start of the carbon monoxide concentration reducing apparatus 100, hydrogen in the hydrogen-rich gas is oxidized in the hydrogen-rich gas oxidation unit to increase the temperature of the hydrogen-rich gas. The thus-warmed hydrogen-rich gas is introduced into the CO-selective oxidation unit 120, so that the internal temperature of the CO-selective oxidation unit 120 is increased.

Figure 8:
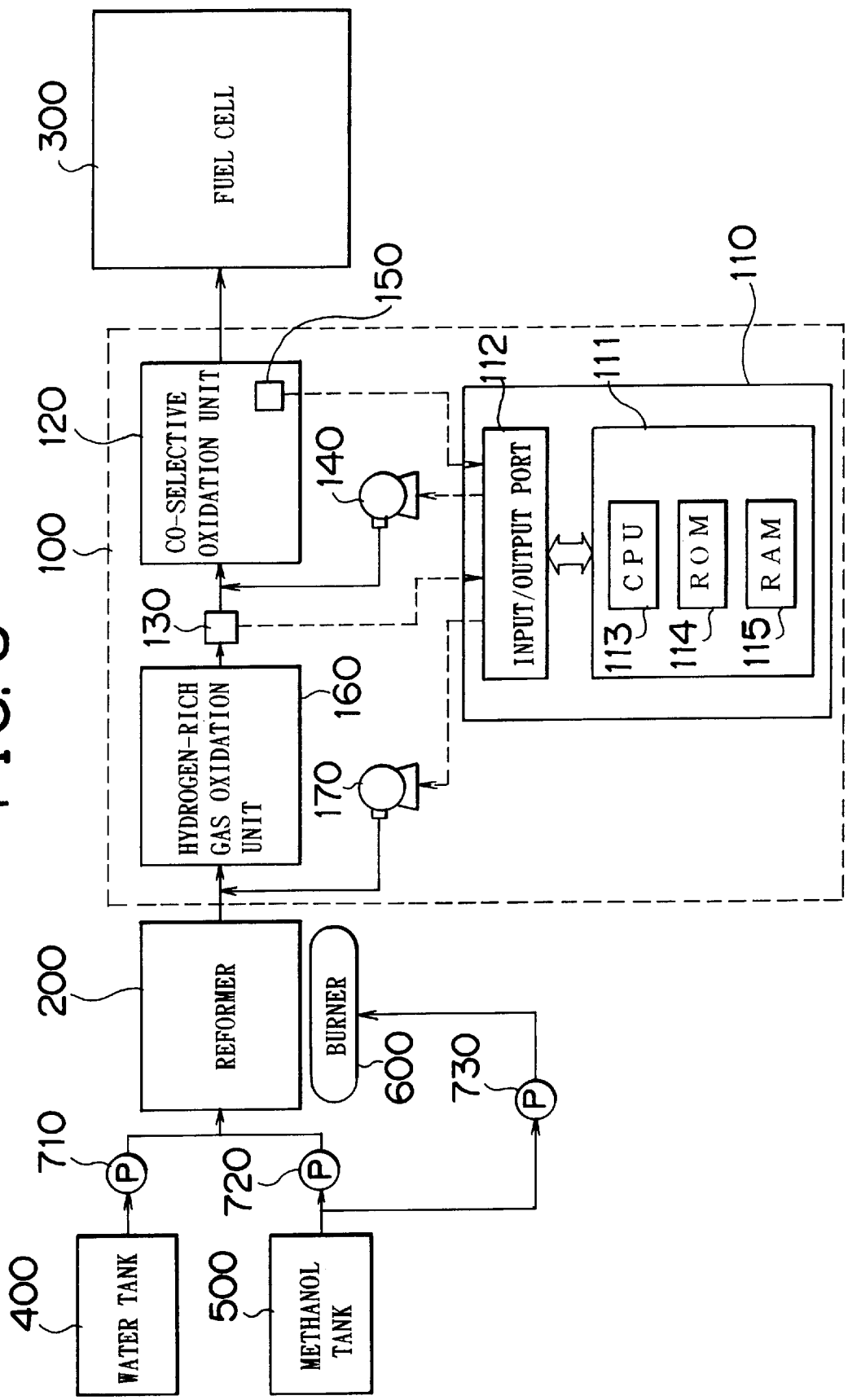
FIG. 8 is a block diagram of a fuel cell system incorporating a carbon monoxide concentration reducing apparatus according to the fourth embodiment of the invention.
Figure 9:
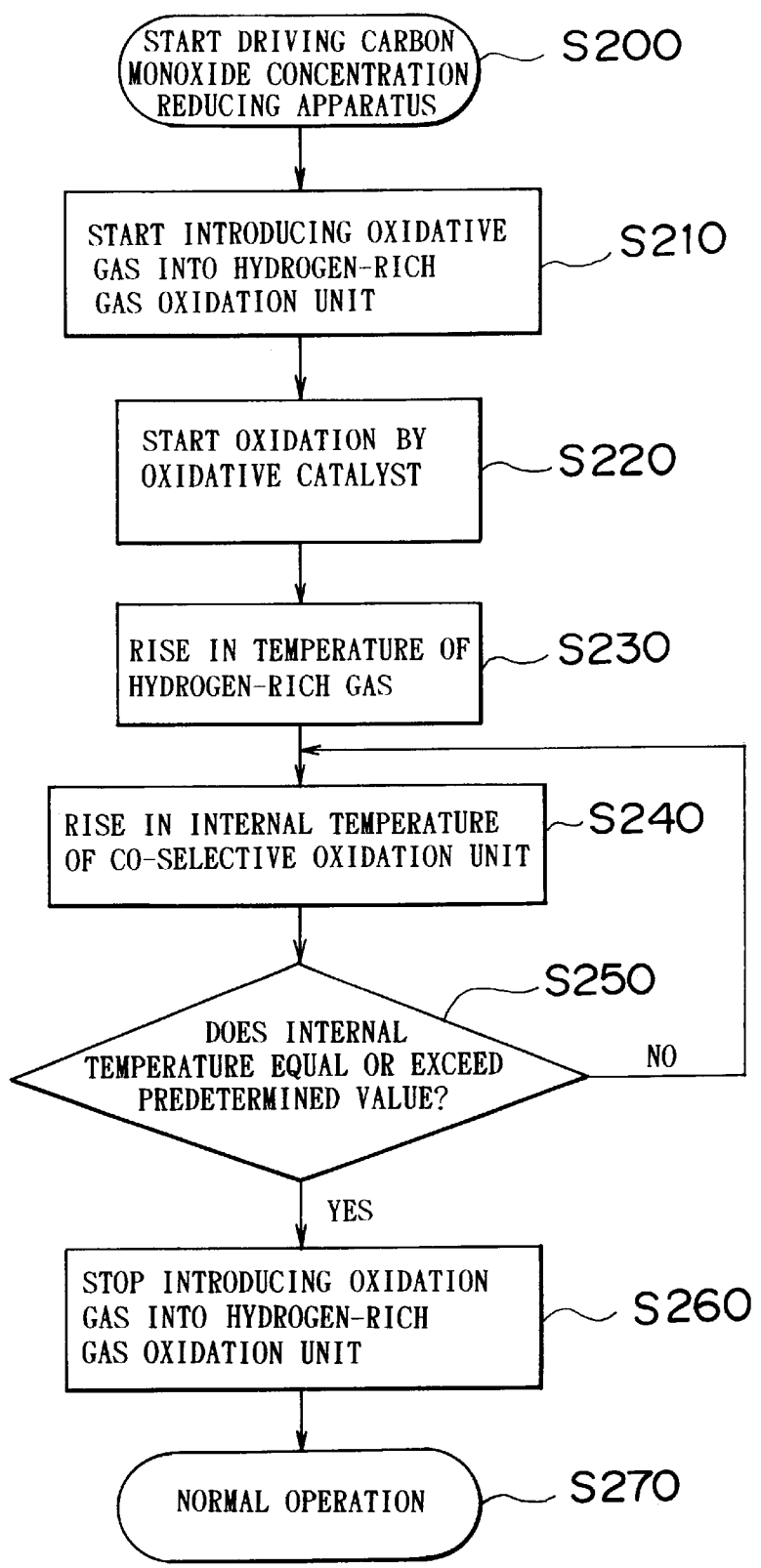
FIG. 9 is a flowchart illustrating an operation that is performed by the carbon monoxide concentration reducing apparatus shown in FIG. 8 when the apparatus is started.

FIG. 8 is a block diagram of a fuel cell system employing a carbon monoxide concentration reducing apparatus according to the fourth embodiment of the invention.

As shown in FIG. 8, in the carbon monoxide concentration reducing apparatus 100 of this embodiment, a hydrogen-rich gas oxidation unit 160 is disposed between a reformer 200 and a carbon monoxide sensor 130, and a blower 170 is provided in addition to a blower 140 as described above.

Similar to the blower 140, the blower 170 draws in an oxidative gas containing oxygen, that is, air in this embodiment, and sends it to a hydrogen-rich gas supply passage extending from the reformer 200 to the hydrogen-rich gas oxidation unit 160, in accordance with a drive signal from a control unit 110. The oxidative gas is thus mixed with the hydrogen-rich gas from the reformer 200.

The hydrogen-rich gas oxidation unit 160 is filled with an oxidation catalyst, for example, a Pt catalyst, similar to that in the first to third embodiments. Therefore, when a mixture of the hydrogen-rich and the oxidative gas is introduced into the hydrogen-rich gas oxidation unit 160, hydrogen in the mixture gas is oxidized via the function of the oxidation catalyst to produce heat. The mixture gas is thereby warmed, and then discharged from the hydrogen-rich gas oxidation unit 160.

Unlike the CO-selective oxidation unit 120 in the first to third embodiments, the CO-selective oxidation unit 120 in the fourth embodiment is filled only with a selective oxidation catalyst 121, that is, no oxidation catalyst 122 is contained therein.

A method of driving the carbon monoxide concentration reducing apparatus of this embodiment at the time of start will be described. FIG. 9 is a flowchart illustrating an operation that is performed by the carbon monoxide concentration reducing apparatus 100 shown in FIG. 8 when the apparatus 100 is started.

When the fuel cell system is started so that the driving of the reformer 200 and the like is started, a hydrogen-rich gas is discharged from the reformer 200. When the driving of the carbon monoxide concentration reducing apparatus 100 is started in step S200 in FIG. 9, the control unit 110 starts driving the blower 170 so that the oxidative gas is supplied by the blower 170 and mixed with the hydrogen-rich gas. The mixture gas is introduced into the hydrogen-rich gas oxidation unit 160 in step S210.

When the mixture of the oxidative gas and the hydrogen-rich gas is introduced into the hydrogen-rich gas oxidation unit 160, the oxidation mainly of hydrogen in the hydrogen-rich gas is started via the function of the oxidation catalyst contained in the hydrogen-rich gas oxidation unit 160 in step S220. Due to heat produced by the oxidation, the temperature of the mixture gas is increased in step S230. The warmed gas is then discharged from the hydrogen-rich gas oxidation unit 160, and the gas flows by the carbon monoxide sensor 130 and then flows into the CO-selective oxidation unit 120. If the blower 140 has been started by the control unit 110 by this time, the oxidative gas supplied by the blower 140 is mixed with the hydrogen-rich gas before the gas is introduced into the CO-selective oxidation unit 120.

When the hydrogen-rich gas warmed by the hydrogen-rich gas oxidation unit 160 is introduced into the CO-selective oxidation unit 120, the internal temperature of the CO-selective oxidation unit 120 also increases in step S240. When the internal temperature of the CO-selective oxidation unit 120 reaches an temperature range in which the selective oxidation catalyst 121 contained in the unit 120 becomes activated, carbon monoxide in the hydrogen-rich gas introduced into the CO-selective oxidation unit 120 is oxidized via the function of the selective oxidation catalyst 121.

During this process, the internal temperature of the CO-selective oxidation unit 120 is detected by the temperature sensor 150, and the detection result is sent to the control unit 110. Based on the detection result, the control unit 110 determines in step S250 whether the internal temperature of the CO-selective oxidation unit 120 has become equal to or higher than a predetermined temperature, that is, reached a sufficient high temperature such that the selective oxidation catalyst 121 can become activated.

When the internal temperature of the CO-selective oxidation unit 120 has become equal to or higher than the predetermined temperature, the control unit 110 performs a control such that the blower 170 stops, in order to stop the supply of oxidation gas to the hydrogen-rich gas oxidation unit 160 in step S260. Therefore, the oxidation catalyzed by the oxidation catalyst in the hydrogen-rich gas oxidation unit 160 stops, so that the hydrogen-rich gas is introduced into the CO-selective oxidation unit 120 without being warmed in the hydrogen-rich gas oxidation unit 160. After that, the control unit 110 performs a normal operation in step S270.

In this embodiment, at the time of start of the carbon monoxide concentration reducing apparatus 100, a hydrogen-rich gas is warmed by the hydrogen-rich gas oxidation unit 160 before being introduced into the CO-selective oxidation unit 120, as described above. Therefore, this embodiment raises the internal temperature of the CO-selective oxidation unit 120 to or above the predetermined temperature in a short time period. That is, the embodiment is able to increase the internal temperature of the CO-selective oxidation unit 120 as quickly as possible to the temperature range in which the selective oxidation catalyst 121 becomes activated. Therefore, the carbon monoxide concentration reducing apparatus 100 quickly becomes able to effectively function.

Furthermore, since the CO-selective oxidation unit 120 contains the selective oxidation catalyst (e.g., the Pt-Ru alloy catalyst) but does not contain the oxidation catalyst (e.g., the Pt catalyst), oxidation (mainly of hydrogen) catalyzed by the oxidation catalyst does not occur in the CO-selective oxidation unit 120. Therefore, the amount of oxygen contained in the oxidative gas introduced into the CO-selective oxidation unit 120 can be used solely for the oxidation catalyzed by the selective oxidation catalyst (that is, the selective oxidation of carbon monoxide), so that smooth progress of the oxidation catalyzed by the selective oxidation catalyst is ensured. Further, since the oxidation catalyzed by the oxidation catalyst in the hydrogen-rich gas oxidation unit 160 is stopped in a steady normal operation, hydrogen contained in the hydrogen-rich gas will not be wasted.

A fifth embodiment of the invention will now be described.

Figure 10:
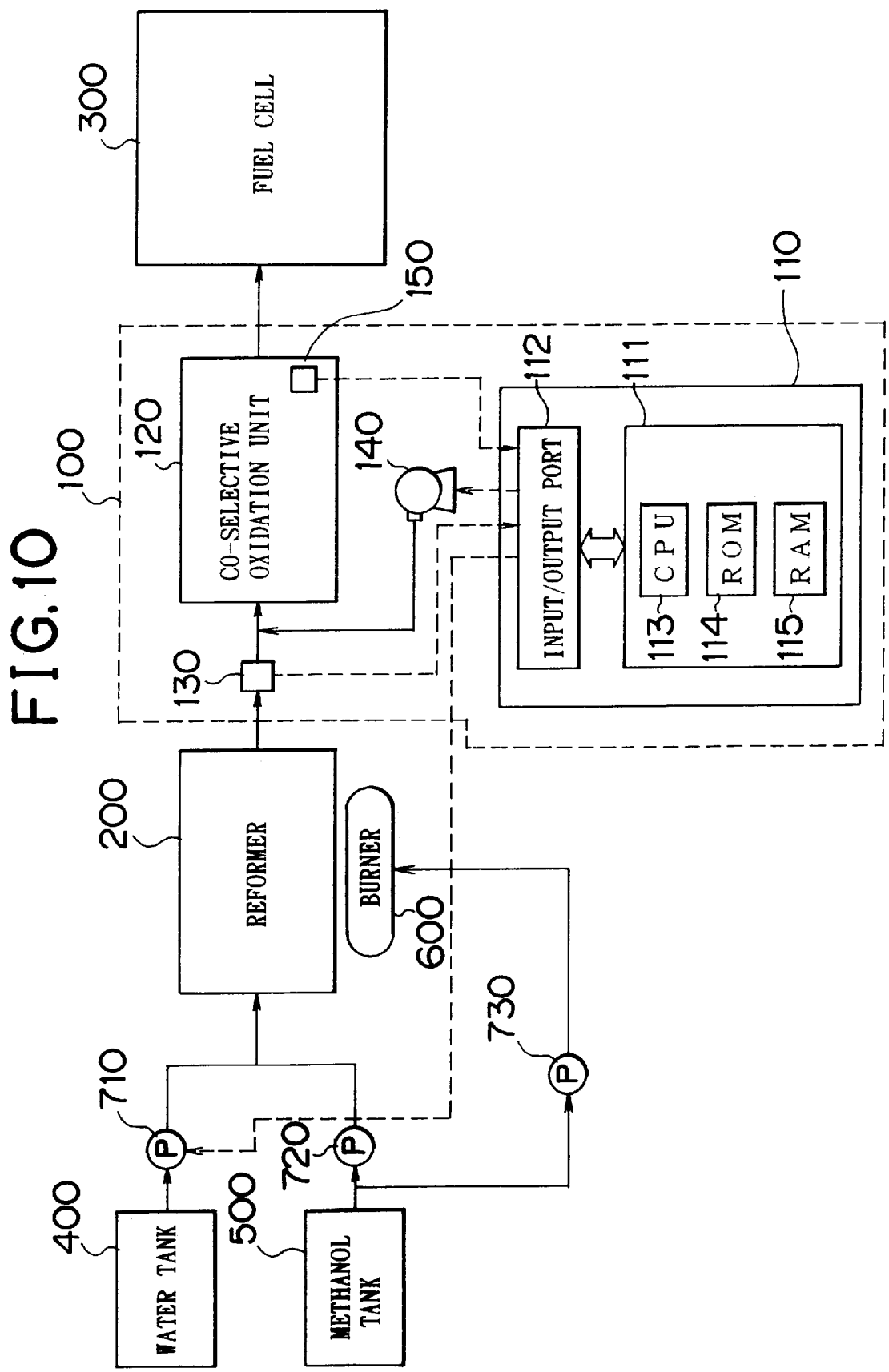
FIG. 10 is a block diagram of a fuel cell system incorporating a carbon monoxide concentration reducing apparatus according to a fifth embodiment of the invention.

FIG. 10 is a block diagram of a fuel cell system employing a carbon monoxide concentration reducing apparatus according to the fifth embodiment of the invention.

Referring to FIG. 10, in the carbon monoxide concentration reducing apparatus 100 of this embodiment, a pump 710 for supplying water from a water tank 400 to a reformer 200 is driven in accordance with a drive signal from a control unit 110. The other constructions of the carbon monoxide concentration reducing apparatus 100 and the fuel cell system are substantially the same as those shown in FIG. 1.

In the first to fourth embodiments, the CO-selective oxidation unit 120 contains the Pt-Ru alloy catalyst as a selective oxidation catalyst that selectively facilitates the oxidation of carbon monoxide. Furthermore, the Pt catalyst is contained as an oxidation catalyst that facilitates oxidation mainly of hydrogen in the hydrogen-rich gas at temperatures substantially equal to a normal room temperature, in the CO-selective oxidation unit 120 in the first to third embodiment, and in the hydrogen-rich gas oxidation unit 160 in the fourth embodiment.

The activity of the selective oxidation catalyst and the oxidation catalyst for the aforementioned oxidizing reactions increases as the amount of moisture contained in the hydrogen-rich gas decreases.

Table 1 indicates a relationship between the moisture content in the hydrogen-rich gas and the rate of oxidation of hydrogen catalyzed by the Pt catalyst, that is, an oxidation catalyst. More specifically, Table 1 shows rates of oxidation of hydrogen catalyzed by the Pt catalyst corresponding to different ratios ($H_2O$/$CH_3OH$ ratio) of water to methanol supplied to the reformer 200, that is, S/C ratios (steam/carbon ratios). As is apparent from Table 1, the rate of oxidation of hydrogen catalyzed by platinum increases as the S/C ratio decreases, that is, as the amount of moisture contained in the hydrogen-rich gas decreases.

TABLE 1

| S/C ratio | Rate of oxidization of hydrogen |
|---|---|
| 1.0 | 95% |
| 1.5 | 50% |
| 2.0 | 10% |

In this embodiment, therefore, the moisture content in the hydrogen-rich gas is reduced at the time of start of the carbon monoxide concentration reducing apparatus 100, so as to enhance the activity of the Pt catalyst contained in the CO-selective oxidation unit 120 for the oxidation of hydrogen and also enhance the activity of the Pt-Ru alloy catalyst also contained in the CO-selective oxidation unit 120 for the oxidation of carbon monoxide.

More specifically, the control unit 110 controls the driving of the pump 710 to control the amount of water supplied to the reformer 200 so that the S/C ratio becomes less at the time of start of the carbon monoxide concentration reducing apparatus 100 than during a steady normal operation thereof. At the time of start, the amount of water supplied is controlled so that the S/C ratio becomes a value (for example, less than about 1) that is smaller than the S/C ratio during the normal operation, which ranges from between about 1.5–3.

Through this control, the amount of water contained in the hydrogen-rich gas introduced from the reformer 200 into the CO-selective oxidation unit 120 becomes less at the time of start than during the normal operation, so that the activity of the Pt catalyst in the CO-selective oxidation unit 120 for the oxidation of hydrogen and the activity of the Pt-Ru alloy catalyst also contained in the CO-selective oxidation unit 120 for the oxidation of carbon monoxide can be enhanced.

Thus, this embodiment enhances the activity of the Pt catalyst in the CO-selective oxidation unit 120 at the time of start of the carbon monoxide concentration reducing apparatus 100, at which time the Pt catalyst needs to function, so that the internal temperature of the CO-selective oxidation unit 120 can be quickly increased. Furthermore, since the activity of the Pt-Ru alloy catalyst can also be enhanced at the time of start of the carbon monoxide concentration reducing apparatus 100, the embodiment is able to reduce the carbon monoxide concentration in the hydrogen-rich gas even at temperatures substantially equal to a normal room temperature.

If a large amount of moisture is contained in the hydrogen-rich gas introduced into the CO-selective oxidation unit 120 immediately after start of the carbon monoxide concentration reducing apparatus 100, condensation is likely to occur in the CO-selective oxidation unit 120 since the internal temperature of the CO-selective oxidation unit 120 is substantially equal to the ambient temperature (normal room temperature) at that time. If condensation occurs inside the CO-selective oxidation unit 120, water droplets formed on catalyst surfaces will impede or inhibit the catalytic function. In this embodiment, however, the moisture content in the hydrogen-rich gas is reduced before the gas is introduced into the CO-selective oxidation unit 120, so that the possibility of condensation in the CO-selective oxidation unit 120 is significantly reduced. Therefore, at the time of start of the carbon monoxide concentration reducing apparatus 100, the catalysts can be reliably caused to function sufficiently to facilitate the oxidizing reactions.

Although in the fifth embodiment, the CO-selective oxidation unit 120 contains the oxidation catalyst (Pt catalyst) in addition to the selective oxidation catalyst (Pt-Ru alloy catalyst), the invention is not limited to this construction. The invention is also applicable to an apparatus in which the CO-selective oxidation unit 120 contains only the selective oxidation catalyst, while achieving substantially the same advantages as described above (except, catalyst activity enhancement achieved by the oxidation catalyst).

A sixth embodiment of the invention will be described.

Figure 11:
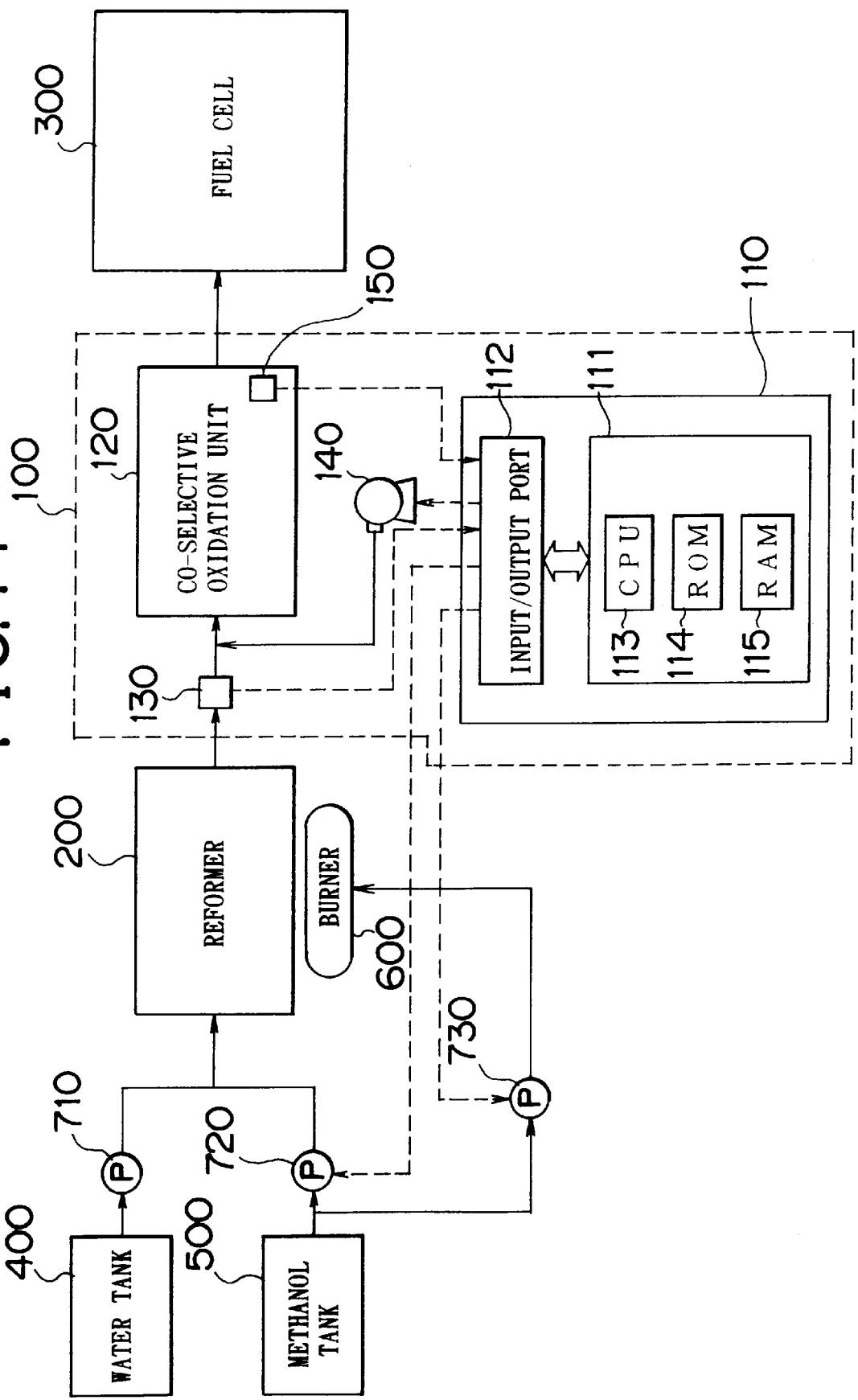
FIG. 11 is a block diagram of a fuel cell system incorporating a carbon monoxide concentration reducing apparatus according to a sixth embodiment of the invention.

FIG. 11 is a block diagram of a fuel cell system employing a carbon monoxide concentration reducing apparatus according to the sixth embodiment of the invention.

In the carbon monoxide concentration reducing apparatus 100 of this embodiment as shown in FIG. 11, a pump 720 for supplying methanol from a methanol tank 500 to a reformer 200 and a pump 730 for supplying methanol from the methanol tank 500 to a burner 600 are driven in accordance with drive signals from a control unit 110. A CO-selective oxidation unit 120 is filled with a selective oxidation catalyst 121, but contains no oxidation catalyst 122, as in the fourth embodiment. The other constructions of the carbon monoxide concentration reducing apparatus 100 and the fuel cell system are substantially the same as those shown in FIG. 1.

In the first to fifth embodiments, when the carbon monoxide concentration reducing apparatus 100 is started, oxidation of mainly hydrogen in the hydrogen-rich gas is caused by using the oxidation catalyst, for example, a Pt catalyst, and heat produced by the oxidation is utilized to increase the internal temperature of the CO-selective oxidation unit 120. In the sixth embodiment, in contrast, when the carbon monoxide concentration reducing apparatus 100 is started, the supply of methanol and the like to the reformer 200 is increased and, furthermore, the internal temperature of the reformer 200 is increased to a level higher than the level for a normal operation.

Figure 12:
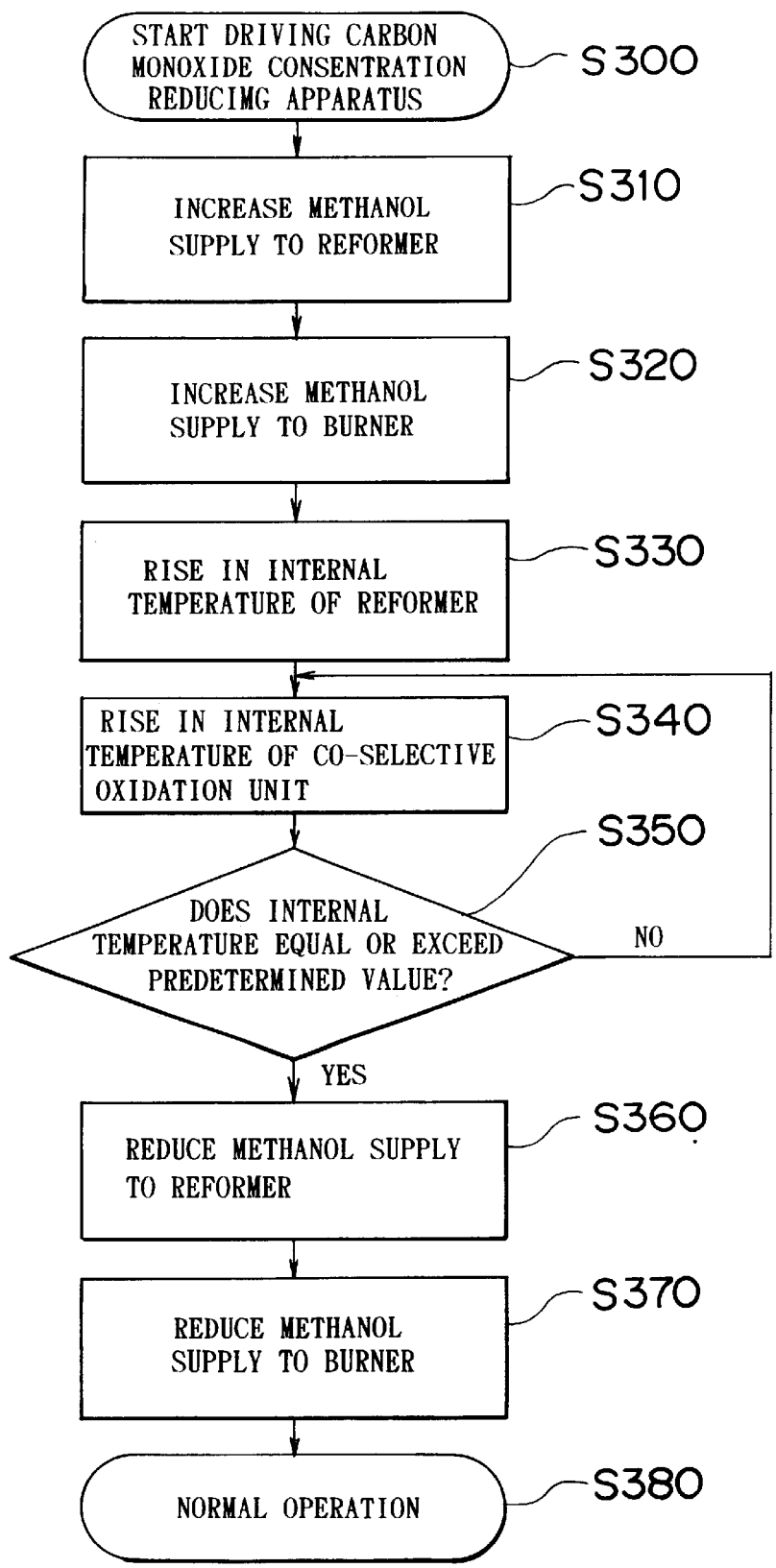
FIG. 12 is a flowchart of an operation that is performed by the carbon monoxide concentration reducing apparatus shown in FIG. 11 when the apparatus is started.

A method of driving the carbon monoxide concentration reducing apparatus 100 at the time of start will be described. FIG. 12 is a flowchart illustrating an operation performed by the carbon monoxide concentration reducing apparatus 100 shown in FIG. 11 when the apparatus 100 is started.

When the fuel cell system is started so that the driving of the reformer 200 and the carbon monoxide concentration reducing apparatus 100 is started in step S300 in FIG. 12, the control unit 110 controls the pump 720 so as to increase the amount of methanol supplied to the reformer 200 by the pump 720 to a level higher than the level for the normal operation in step S310. More specifically, the amount of methanol supplied to the reformer 200 by the pump 720 is increased to about three times the level for the normal operation. The control unit 110 also controls the pump 730 so as to increase the amount of methanol supplied to the burner 600 by the pump 730 to a level higher than the level for the normal operation in step S320.

By increasing the supply of methanol to the reformer 200 in the above-described manner, the amount of hydrogen-rich gas produced by the reformer 200 is increased, so that the flow of hydrogen-rich gas from the reformer 200 into the CO-selective oxidation unit 120 is increased to a level higher than the level for the normal operation. Furthermore, since the supply of methanol to the burner 600 is increased, the internal temperature of the reformer 200 increases to a level higher than the level for the normal operation in step S330. Therefore, the temperature of the hydrogen-rich gas introduced from the reformer 200 into the CO-selective oxidation unit 120 also increases. More specifically, whereas the operating temperature (internal temperature) of the reformer 200 during the normal operation is about 200–300° C. as mentioned above, the operating temperature (internal temperature) of the reformer 200 is increased to about 400° C. at the time of start of the apparatus.

Through this operation, an increased amount of warmed hydrogen-rich gas flows into the CO-selective oxidation unit 120, so that the internal temperature of the CO-selective oxidation unit 120 increases in step S340.

When the internal temperature of the CO-selective oxidation unit 120, filled with the selective oxidation catalyst 121 as described above, reaches a temperature range in which the selective oxidation catalyst becomes activated, carbon monoxide in the hydrogen-rich gas is selectively oxidized via the function of the selective oxidation catalyst 121. During this process, the internal temperature of the CO-selective oxidation unit 120 is detected by the temperature sensor 150, and the detection result is inputted to the control unit 110. Based on the detection result, the control unit 110 determines in step S350 whether the internal temperature of the CO-selective oxidation unit 120 has reached or exceeded a predetermined temperature, that is, a sufficiently high temperature such that the selective oxidation catalyst 121 can become activated.

When the internal temperature of the CO-selective oxidation unit 120 reaches or exceeds the predetermined temperature, the control unit 110 controls the pump 720 so as to reduce the amount of methanol supplied to the reformer 200 by the pump 720 in step S360. The control unit 110 also controls the pump 730 so as to reduce the amount of methanol supplied to the burner 600 by the pump 730 in step S370. Subsequently in step S380, the normal operation is performed.

In this embodiment, since the flow of the hydrogen-rich gas from the reformer 200 into the CO-selective oxidation unit 120 is increased and the temperature of the gas is also increased at the time of start of the carbon monoxide concentration reducing apparatus 100, the internal temperature of the CO-selective oxidation unit 120 can be increased to or above the predetermined temperature in a short time period. Therefore, the embodiment is able to increase the internal temperature of the CO-selective oxidation unit 120 as quickly as possible to the temperature range in which the selective oxidation catalyst 121 becomes activated. Consequently, the carbon monoxide concentration reducing apparatus 100 will quickly become able to effectively function.

Furthermore, since the CO-selective oxidation unit 120 is filled with the selective oxidation catalyst 121 but does not contain the oxidation catalyst (e.g., Pt catalyst), the oxidation (mainly of hydrogen) catalyzed by the oxidation catalyst does not occur in the CO-selective oxidation unit 120. Therefore, the amount of oxygen contained in the oxidative gas introduced into the CO-selective oxidation unit 120 can be used solely for the oxidation catalyzed by the selective oxidation catalyst 121 (that is, the selective oxidation of carbon monoxide), so that smooth progress of the oxidation catalyzed by the selective oxidation catalyst 121 is ensured. Furthermore, hydrogen contained in the hydrogen-rich gas introduced into the CO-selective oxidation unit 120 will not be uselessly consumed.

According to this embodiment, during the operation of increasing the supply of methanol to the reformer 200 so as to increase the amount of hydrogen-rich gas produced by the reformer 200, the control unit 110 may also control the pump 710 so as to increase the supply of water to the reformer 200 by an amount corresponding to an increase in the supply of methanol, if necessary.

Table 2 shows the lengths of time that were measured between the start of the carbon monoxide concentration reducing apparatus and attainment of the predetermined internal temperature (150° C.) throughout substantially the entire CO-selective oxidation unit in a related-art example (Control Example) and Examples 1–6 corresponding to the first to six embodiments of the invention.

TABLE 2

| | Time consumed before the entire internal temperature of the CO-selective oxidation unit reached 150° C. |
|---|---|
| Control Example | About 7 minutes |
| Example 1 | About 2 minutes |
| Example 2 | About 1.5 minutes |
| Example 3 | About 1.5 minutes |
| Example 4 | About 2 minutes |
| Example 5 | About 3 minutes |
| Example 6 | About 3 minutes |

As shown in Table 2, whereas the Control Example required about 7 minutes before attainment of the predetermined internal temperature (150° C.), Examples 1–6 according to the invention (corresponding to the first to sixth embodiments) only required about 3 minutes at longest and about 1.5 minutes at shortest. The results show that the foregoing embodiments are able to more quickly raise the internal temperature of the CO-selective oxidation unit to the temperature range in which the selective oxidation catalyst becomes activated. According to the embodiments, therefore, the carbon monoxide concentration reducing apparatus according to this invention will quickly become able to effectively function.

Although the foregoing embodiments use the Pt-Ru alloy catalyst as a selective oxidation catalyst, this is merely illustrative and does not restrict the invention. According to the invention, the selective oxidation catalyst may be any suitable catalyst that selectively facilitates the oxidation of carbon monoxide in a desired temperature range. For example, the selective oxidation catalyst may also be a ruthenium catalyst, a rhodium catalyst, a catalyst formed of ruthenium and rhodium, and the like.

Furthermore, although the foregoing embodiments use a Pt catalyst as the oxidation catalyst, this is merely illustrative and does not restrict the invention. According to the invention, the oxidation catalyst may be any suitable catalyst that facilitates the oxidation of at least one component of the hydrogen-rich gas at a temperature substantially equal to a temperature that lies in a normal room temperature range.

Furthermore, the aforementioned embodiments may be combined. For example, by combining the fourth or fifth embodiment, in which the CO-selective oxidation unit 120 contains only the selective oxidation catalyst 121 as a catalyst, with any one of the first to third embodiments, the CO-selective oxidation unit 120 contains the oxidation catalyst 122 in addition to the selective oxidation catalyst 121.

Although in the foregoing embodiments, the control unit 110 functions as a control unit of the carbon monoxide concentration reducing apparatus 100, the control unit 110 may also be used as a control unit of the entire fuel cell system.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A method for reducing carbon monoxide concentration in a carbon monoxide reducing apparatus, comprising the steps of:

introducing a hydrogen-rich gas containing carbon monoxide into a reaction chamber containing a first catalyst and a second catalyst, wherein the first catalyst selectively facilitates oxidation of carbon monoxide;

reducing a carbon monoxide concentration in a hydrogen-rich gas by oxidizing carbon monoxide contained in the hydrogen-rich gas by using the first catalyst;

discharging the hydrogen-rich gas in which the carbon monoxide concentration has been reduced, from the reaction chamber; and raising a temperature of the reaction chamber to or above a predetermined temperature at least from when the apparatus is started until the first catalyst has reached its active temperature, wherein the first catalyst (i) has an active temperature that is higher than the active temperature of the second catalyst and (ii) becomes active at a lowest temperature that is above the normal room temperature and the temperature of the reaction chamber is raised using a means for raising the temperature, including the second catalyst having an active temperature at normal room temperature.

2. A method according to claim 1, wherein the step of raising the temperature of the reaction chamber includes the step of oxidizing at lest one component of the hydrogen-rich gas by using the second catalyst which facilitates oxidation of the at least one component.

3. A method according to claim 1, further comprising the step of raising a temperature of the hydrogen-rich gas that is to be introduced into the reaction chamber, at least when the carbon monoxide concentration reducing apparatus is started.

4. A method according to claim 3, wherein the step of raising the temperature of the hydrogen-rich gas that is to be introduced into the reaction chamber includes the step of oxidizing at least one component of the hydrogen-rich gas to produce heat by using the second catalyst which facilitates oxidation of the at least one component.

5. A method according to claim 1, further comprising the steps of:

producing the hydrogen-rich gas through reaction of a supply of a fuel material by applying heat to the fuel material; and increasing the supply of the fuel material and an amount of heat applied to the fuel material to or above respectively predetermined amounts, at least when the carbon monoxide concentration apparatus is started.

6. A carbon monoxide concentration reducing apparatus for reducing a concentration of carbon monoxide contained in a hydrogen-rich gas, wherein the carbon monoxide has a lower concentration than hydrogen in the hydrogen-rich gas, by oxidation using oxygen contained in an oxygen-containing oxidative gas, the apparatus comprising:

a selective oxidizer unit, containing both a first catalyst and a second catalyst, that lowers a concentration of carbon monoxide contained in a hydrogen-rich gas by selective oxidation using oxygen contained in an oxygen-containing oxidative gases;

at least one inlet that introduces the hydrogen-rich gas and the oxygen-containing oxidative gas into the selective oxidizer unit;

a first catalyst comprising a plurality of first catalyst particles provided in the selective oxidizer unit, the first catalyst selectively facilitating oxidation of carbon monoxide; and a second catalyst comprising a plurality of second catalyst particles provided in the selective oxidizer unit having an active temperature at a normal room temperature, the second catalyst facilitating an exothermic oxidation reaction of at least one component of the hydrogen-rich gas with the oxygen contained in the oxygen-containing oxidative gas, wherein the first catalyst particles (i) have a higher active temperature than the active temperature of the second catalyst particles and (ii) become active at a lowest temperature that is above the normal room temperature.

7. The carbon monoxide concentration reducing apparatus according to claim 6, wherein the at least one inlet comprises a mixing inlet, and the carbon monoxide concentration reducing apparatus further comprises:

a gas mixing device connected to the mixing inlet of the selective oxidizer unit that mixes the hydrogen-rich gas and the oxidative gas before introducing the hydrogen-rich gas and the oxidative gas into the selective oxidizer unit via the mixing inlet, and wherein the plurality of the second catalyst particles is provided together adjacent to the mixing inlet of the selective oxidizer unit.

8. The carbon monoxide concentration reducing apparatus according to claim 6, wherein the plurality of the second catalyst particles is distributed throughout an entire interior of the selective oxidizer unit.

9. The carbon monoxide concentration reducing apparatus according to claim 6, wherein:

the at least one inlet comprises a first inlet and a second inlet;

the first inlet is connected to the selective oxidizer unit through which the oxygen-containing oxidative gas is introduced into the selective oxidizer unit; and the second inlet is connected to the selective oxidizer unit through which at least the hydrogen-rich gas is introduced into the selective oxidizer unit, wherein the plurality of the second catalyst particles is provided adjacent to the first inlet.

10. The carbon monoxide concentration reducing apparatus according to claim 6, wherein the second catalyst is a platinum catalyst.

11. The carbon monoxide concentration reducing apparatus according to claim 6, further comprising a moisture controller that controls an amount of moisture contained in the hydrogen-rich gas, wherein the moisture controller reduces the amount of moisture contained in the hydrogen-rich gas to a predetermined amount at least at a time when the apparatus is started.

12. The carbon monoxide concentration reducing apparatus according to claim 6, wherein an internal temperature of the selective oxidizer unit is increased to an active temperature of the first catalyst by heat generated in the exothermic oxidation reaction.

13. A fuel cell system comprising a carbon monoxide concentration reducing apparatus according to claim 6.

14. A carbon monoxide concentration reducing apparatus for reducing a concentration of carbon monoxide contained in a hydrogen-rich gas, wherein the carbon monoxide has a lower concentration than hydrogen in the hydrogen-rich gas, by oxidation using oxygen contained in an oxygen-containing oxidative gas, the apparatus comprising:

a selective oxidizer unit, containing both a first catalyst and a second catalyst, that lowers a concentration of carbon monoxide contained in a hydrogen-rich gas by selective oxidation using oxygen contained in an oxygen-containing oxidative gas;

an inlet that introduces the hydrogen-rich gas and the oxygen-containing oxidative gas into the selective oxidizer unit; and a temperature raiser that raises a temperature of the hydrogen-rich gas to a predetermined temperature by using an exothermic reaction, promoted at a normal room temperature, before the hydrogen-rich gas is introduced into the selective oxidizer unit wherein the first catalyst, provided in the selective oxidizer unit, (i) has an active temperature that is higher than a normal room temperature and (ii) becomes active at a lowest temperature that is above the normal room temperature, and the first catalyst selectively facilitates oxidation of carbon monoxide and the second catalyst has an active temperature at room temperature.

15. The carbon monoxide concentration reducing apparatus according to claim 14, further comprising a second catalyst provided in the temperature raiser, the second catalyst having an active temperature at a normal room temperature, and the second catalyst facilitating an exothermic oxidation reaction of at least one component of the hydrogen-rich gas with the oxygen contained in an oxygen-containing oxidative gas.

16. The carbon monoxide concentration reducing apparatus according to claim 15, wherein the second catalyst is a platinum catalyst.

17. The carbon monoxide concentration reducing apparatus according to claim 14, further comprising a moisture controller that controls an amount of moisture contained in the hydrogen-rich gas, wherein the moisture controller reduces the amount of moisture in the hydrogen-rich gas to a predetermined amount at least at a time when the apparatus is started.

18. The carbon monoxide concentration reducing apparatus according to claim 14, further comprising:

a hydrogen-rich gas producer that produces the hydrogen-rich gas from a raw material;

a source that supplies the raw material to the hydrogen-rich gas producer; and a heater that raises an internal temperature of the hydrogen-rich gas producer;

wherein, when the apparatus is started, the source increases an amount of the raw material to a predetermined amount and the heater raises the internal temperature to a predetermined temperature.

19. A fuel cell system comprising a carbon dioxide concentration reducing apparatus according to claim 14.

20. A carbon monoxide concentration reducing apparatus for reducing a concentration of carbon monoxide contained in a hydrogen-rich gas, wherein the carbon monoxide has a lower concentration than hydrogen in the hydrogen-rich gas, by oxidation using oxygen contained in an oxygen-containing oxidative gas, the apparatus comprising:

a selective oxidizer unit, containing both a first catalyst and a second catalyst, that lowers a concentration of carbon monoxide contained in a hydrogen-rich gas by selective oxidation and an exothermic oxidation reaction promoted at a normal room temperature using oxygen contained in an oxygen-containing oxidative gas;

an introducing passage that introduces the hydrogen-rich gas and the oxygen-containing oxidative gas into the selective oxidizer unit; and a moisture controller that controls an amount of moisture contained in the hydrogen-rich gas introduced into the selective oxidizer unit, wherein at least at a time when the apparatus is started, the moisture controller reduces the amount of moisture contained in the hydrogen-rich gas to a predetermined amount wherein the first catalyst provided in the selective oxidizer unit selectively facilitates oxidation of carbon monoxide and the second catalyst has an active temperature at room temperature.

21. A carbon monoxide concentration reducing apparatus for reducing a concentration of carbon monoxide contained in a hydrogen-rich gas, wherein the carbon monoxide has a lower concentration than hydrogen in the hydrogen-rich gas, by oxidation using oxygen contained in an oxygen-containing oxidative gas, the apparatus comprising:

a selective oxidizer unit, containing both a first catalyst and a second catalyst, that lowers a concentration of carbon monoxide contained in a hydrogen-rich gas by selective oxidation using oxygen contained in an oxygen-containing oxidative gas;

an inlet that introduces the hydrogen-rich gas and the oxygen-containing oxidative gas into the selective oxidizer unit;

a first catalyst comprising a plurality of first catalyst particles provided in the selective oxidizer unit, the first catalyst selectively facilitating oxidation of carbon monoxide; and a second catalyst comprising a plurality of second catalyst particles provided in the selective oxidizer unit, the second catalyst facilitating an exothermic oxidation reaction of hydrogen contained in the hydrogen-rich gas with the oxygen contained in the oxygen-containing oxidative gas, wherein the second catalyst particles have an active temperature at a normal room temperature and the first catalyst particles (i) have an active temperature that is higher than the active temperature of the second catalyst particles and (ii) become active at a lowest temperature that is above the normal room temperature.

22. A carbon monoxide concentration reducing apparatus, comprising:

means for introducing a hydrogen-rich gas containing carbon monoxide into a reaction chamber containing a first catalyst and a second catalyst, wherein the first catalyst selectively facilitates oxidation of carbon monoxide;

means for reducing a carbon monoxide concentration in a hydrogen-rich gas by oxidizing carbon monoxide contained in the hydrogen-rich gas by using the first catalyst;

means for discharging the hydrogen-rich gas in which the carbon monoxide concentration has been reduced, from the reaction chamber; and means for raising a temperature of the reaction chamber to or above a predetermined temperature at least when the apparatus is started, the means for raising including a second catalyst, wherein the second catalyst has an active temperature at a normal room temperature and the first catalyst (i) has an active temperature that is higher than the active temperature of the second catalyst and (ii) becomes active at a lowest temperature that is above the normal room temperature.

* * * * *